(12) United States Patent
Fukuda et al.

(10) Patent No.: US 7,475,978 B2
(45) Date of Patent: *Jan. 13, 2009

(54) RECORDING LIQUID, LIQUID CARTRIDGE, LIQUID EJECTION CARTRIDGE, LIQUID EJECTION APPARATUS, AND LIQUID EJECTION METHOD

(75) Inventors: Toshio Fukuda, Kanagawa (JP); Masato Nakamura, Kanagawa (JP); Yuji Yakura, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/745,200

(22) Filed: May 7, 2007

(65) Prior Publication Data

US 2007/0206080 A1 Sep. 6, 2007

Related U.S. Application Data

(62) Division of application No. 11/027,147, filed on Dec. 30, 2004, now Pat. No. 7,344,237.

(30) Foreign Application Priority Data

Jan. 15, 2004 (JP) ............................. 2004-008410

(51) Int. Cl.
*G01D 11/00* (2006.01)

(52) U.S. Cl. ............................. 347/100; 347/95; 347/86

(58) Field of Classification Search ................. 347/100, 347/95, 96, 101, 84, 85, 86; 106/31.6, 31.13, 106/31.27; 523/160
See application file for complete search history.

(56) References Cited

U.S. PATENT DOCUMENTS

2005/0162457 A1* 7/2005 Fukuda et al. ................. 347/21

FOREIGN PATENT DOCUMENTS

| JP | 02-151674 | 6/1990 |
| JP | 2002-029045 | 1/2002 |
| JP | 2003-113418 | 4/2003 |
| JP | 2003-192966 | 7/2003 |
| JP | 2003-285539 | 10/2003 |
| JP | 2004-018689 | 1/2004 |
| JP | 2005-008853 | 1/2005 |
| JP | 2005-112881 | 4/2005 |

* cited by examiner

*Primary Examiner*—Manish S Shah
(74) *Attorney, Agent, or Firm*—Sonnenschein Nath & Rosenthal LLP

(57) ABSTRACT

A recording liquid contains a coloring matter, a solvent for dissolving or dispersing the coloring matter, and a nonionic surfactant, wherein the recording liquid has a foaming power of 0 mm to 50 mm and a foam stability of 0 mm to 50 mm, the foaming power and the foam stability being determined by substantially the same test method as that used to determine the foaming power and foam stability according to JIS-K3362. A liquid cartridge containing the recording liquid, a liquid ejection cartridge which ejects the recording liquid, a liquid ejection apparatus, and a liquid ejection method are also disclosed.

5 Claims, 10 Drawing Sheets

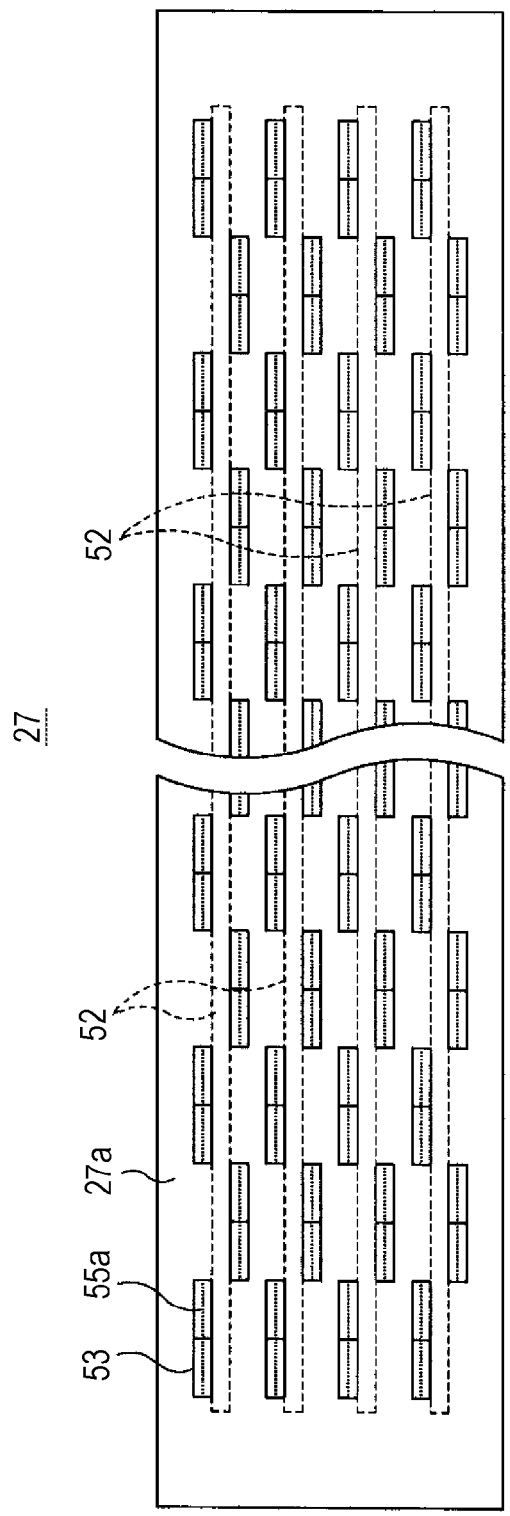

US 7,475,978 B2

RECORDING LIQUID, LIQUID CARTRIDGE, LIQUID EJECTION CARTRIDGE, LIQUID EJECTION APPARATUS, AND LIQUID EJECTION METHOD

RELATED APPLICATION DATA

This application is a divisional of U.S. patent application Ser. No. 11/027,147, filed Dec. 30, 2004, the entirety of which is incorporated herein by reference to the extent permitted by law. The present invention claims priority to Japanese Patent Application No. 2004-008410 filed in the Japanese Patent Office on Jan. 15, 2004, the entirety of which also is incorporated by reference herein to the extent permitted by law.

BACKGROUND OF THE INVENTION

1. Field of the Invention

The present invention relates to a recording liquid for recording on an object, a liquid cartridge which contains the recording liquid, a liquid ejection cartridge which ejects the recording liquid onto the object, a liquid ejection apparatus, and a liquid ejection method.

2. Description of the Related Art

One example of a liquid ejection apparatus is an ink-jet printer which ejects ink from an ink ejection head onto an object, such as recording paper, coated paper, a plastic film, or woven fabric, in order to record images and characters on the object. The ink-jet printer has the advantages of low running cost, reduction in size of the apparatus, and ease of printing color images.

In an ink-jet printer, inks are supplied from ink cartridges which are filled with inks having a plurality of colors, such as yellow, magenta, cyan, and black, to ink liquid chambers, etc., of an ink ejection head. In the printer, a pressure is applied to the ink supplied to each ink liquid chamber, etc., by a pressure-generating element, such as a heating resistor or a piezoelectric element, disposed in the ink liquid chamber, so that the ink is ejected in the form of droplets from microscopic ink ejection ports, i.e., nozzles, provided on the ink ejection head, and the ejected ink droplets are allowed to land on an object, such as recording paper, thus printing images and characters.

The ink used for the ink-jet printer is, for example, prepared by dissolving or dispersing any of various types of dyes or pigments in a solvent. Among the various properties required for the ink, examples of important ink properties include nozzle anti-clogging properties, anti-bleeding properties to prevent ink from bleeding on the object, quick-drying properties, and long-term stability, i.e., no change in the ink's properties even if the ink is kept for a long period of time. Many studies have been conducted regarding these properties.

In addition to the important properties described above, it is also important to maintain stable ejection properties for a long period of time. As a method to meet this requirement, Japanese Unexamined Patent Application Publication Nos. 56-5871 and 57-102971 each describe the addition of a surfactant, an oxygen absorbent, or the like.

However, in ink-jet printers, if ink containing a surfactant or the like is ejected at high speed, namely, ink is ejected from one nozzle 5,000 times or more per second, for example, by driving a pressure-generating element with a pulsed current at a frequency of 5 kHz or more, movement of the ink in the ink ejection head becomes noticeable and in some cases, microscopic air bubbles or the like may be produced, resulting in problems in ink ejection. Furthermore, microscopic air bubbles may clog the nozzles, resulting in non-ejection of ink or degradation in the frequency responsiveness, such as difficulty in ejecting ink at a predetermined interval. Such degradation in ejection stability becomes noticeable as the drive frequency for driving the pressure-generating element increases, for example, to 6 kHz or 8 kHz.

In ink-jet printers, recently, the nozzle diameter has been miniaturized to a size of 20 μm or less, and the volume of one droplet has been reduced to 10 pl or less. In such a printer, when the nozzle diameter is miniaturized, the influence of microscopic air bubbles generated in the ink becomes further noticeable by causing a degradation in ejection stability. Namely, since the nozzle diameter is miniaturized, even if air bubbles are microscopic, the air bubbles may clog the nozzles, resulting in non-ejection of ink.

SUMMARY OF THE INVENTION

It is an object of the present invention to provide a recording liquid capable of inhibiting microscopic air bubbles from being produced in the liquid, a liquid cartridge containing the recording liquid, a liquid ejection cartridge capable of ejecting droplets with excellent frequency responsiveness and ejection stability using the recording liquid, a liquid ejection apparatus, and a liquid ejection method.

In one aspect of the present invention, a recording liquid contains a coloring matter, a solvent for dissolving or dispersing the coloring matter, and a nonionic surfactant, wherein the recording liquid is contained in a liquid chamber of a liquid ejection apparatus which includes the liquid chamber for containing a liquid, a pressure-generating element which generates a pressure to press the liquid contained in the liquid chamber, and an ejection device which is provided with an ejection port for ejecting the liquid pressed by the pressure-generating element in the form of droplets, which drives the pressure-generating element with a pulsed current at a frequency of 5 kHz or more, and which ejects each droplet with a volume of 10 pl or less, the recording liquid being formed into droplets and allowed to adhere to an object so that recording is performed on the object, and wherein the recording liquid has a foaming power of 0 mm to 50 mm and a foam stability of 0 mm to 50 mm, the foaming power and the foam stability being determined by substantially the same test method as that for foaming power and foam stability according to JIS-K3362.

In another aspect of the present invention, a liquid cartridge includes a liquid container section for containing a recording liquid and a liquid supply section for supplying the recording liquid contained in the liquid container section to an ejection device, the liquid cartridge being detachably installed in a liquid ejection apparatus which includes a liquid chamber for containing the recording liquid, a pressure-generating element which generates a pressure to press the recording liquid contained in the liquid chamber, and the ejection device which is provided with an ejection port for ejecting the recording liquid pressed by the pressure-generating element in the form of droplets, which drives the pressure-generating element with a pulsed current at a frequency of 5 kHz or more, and which ejects each droplet with a volume of 10 pl or less, the liquid cartridge functioning as a supply source of the recording liquid to the ejection device, wherein the recording liquid contains a coloring matter, a solvent for dissolving or dispersing the coloring matter, and a nonionic surfactant, and the recording liquid has a foaming power of 0 mm to 50 mm and a foam stability of 0 mm to 50 mm, the foaming power and the foam stability being determined by substantially the same test method as that used to determine the foaming power and foam stability according to JIS-K3362.

In another aspect of the present invention, a liquid ejection cartridge includes a liquid chamber for containing a recording liquid supplied from a liquid container section filled with the recording liquid, a pressure-generating element which generates a pressure to press the recording liquid contained in the liquid chamber, and an ejection device which is provided with an ejection port for ejecting the recording liquid pressed by the pressure-generating element in the form of droplets, which drives the pressure-generating element with a pulsed current at a frequency of 5 kHz or more, and which ejects each droplet with a volume of 10 pl or less, the liquid ejection cartridge being detachably installed in a liquid ejection apparatus which allows the recording liquid to adhere to an object to perform recording, wherein the recording liquid contains a coloring matter, a solvent for dissolving or dispersing the coloring matter, and a nonionic surfactant, and the recording liquid has a foaming power of 0 mm to 50 mm and a foam stability of 0 mm to 50 mm, the foaming power and the foam stability being determined by substantially the same test method as that used to determine the foaming power and foam stability according to JIS-K3362.

In another aspect of the present invention, a liquid ejection apparatus, which allows a recording liquid to adhere to an object to perform recording, includes a liquid chamber for containing the recording liquid supplied from a liquid container section filled with the recording liquid, a pressure-generating element which generates a pressure to press the recording liquid contained in the liquid chamber, and an ejection device which is provided with an ejection port for ejecting the recording liquid pressed by the pressure-generating element in the form of droplets, which drives the pressure-generating element with a pulsed current at a frequency of 5 kHz or more, and which ejects each droplet with a volume of 10 pl or less, wherein the recording liquid contains a coloring matter, a solvent for dissolving or dispersing the coloring matter, and a nonionic surfactant, and the recording liquid has a foaming power of 0 mm to 50 mm and a foam stability of 0 mm to 50 mm, the foaming power and the foam stability being determined by substantially the same test method as that used to determine the foaming power and foam stability according to JIS-K3362.

In another aspect of the present invention, a liquid ejection method includes allowing a recording liquid to adhere to an object using a liquid ejection apparatus which includes a liquid chamber for containing the recording liquid supplied from a liquid container section filled with the recording liquid, a pressure-generating element which generates a pressure to press the recording liquid contained in the liquid chamber, and an ejection device provided with an ejection port for ejecting the recording liquid pressed by the pressure-generating element in the form of droplets, wherein, when the pressure-generating element is driven with a pulsed current at a frequency of 5 kHz or more and droplets each with a volume of 10 pl or less are ejected from the ejection port, the recording liquid used contains a coloring matter, a solvent for dissolving or dispersing the coloring matter, and a nonionic surfactant, the recording liquid having a foaming power of 0 mm to 50 mm and a foam stability of 0 mm to 50 mm, the foaming power and the foam stability being determined by substantially the same test method as that used to determine the foaming power and foam stability according to JIS-K3362.

In accordance with the present invention, by preparing the recording liquid so as to have a foaming power of 0 m to 50 m and a foam stability of 0 mm to 50 mm, the foaming power and the foam stability being determined by substantially the same test method as that used to determine the foaming power and foam stability according to JIS-K3362, when the pressure-generating element is driven with a pulsed current at a frequency of 5 kHz or more and droplets each with a volume of 10 pl or less are ejected from the ejection port, it is possible to inhibit microscopic air bubbles from being produced in the recording liquid.

In accordance with the present invention, by preparing the recording liquid so as to have a foaming power of 0 mm to 50 mm and a foam stability of 0 mm to 50 mm, thus inhibiting microscopic air bubbles from being produced in the recording liquid, when the pressure-generating element is driven with a pulsed current at a frequency of 5 kHz or more and droplets each with a volume of 10 pl or less are ejected from the ejection port, namely, when high-speed ejection is performed, it is possible to prevent ejection stability from degrading because of clogging of the ejection port which may be caused by microscopic air bubbles occurring in the recording liquid.

Furthermore, in accordance with the present invention, since excellent ejection stability is achieved even when high-speed ejection is performed, it is possible to record a high-quality image in a short period of time in which degradation in image quality due to non-ejection of the recording liquid or the like is inhibited.

BRIEF DESCRIPTION OF THE DRAWINGS

FIG. 6 is a plan view which shows an ejection surface of the ink-jet printer head cartridge;

DESCRIPTION OF THE PREFERRED EMBODIMENTS

The present inventors have found that when a pressure-generating element is driven with a pulsed current at a high frequency, for example, at 5 kHz or more, to eject droplets from an ejection port, the achievement of frequency responsiveness and ejection stability is influenced by the wettability of the inner wall of the ejection port and is greatly influenced by microscopic air bubbles adhering to the inner wall of the ejection port during ejection. Namely, such microscopic air bubbles are generated when droplets are ejected from the ejection port, and are caused as a result of adherence to the inner wall of the ejection port. The air bubbles remaining in the ejection port cause adverse effects, for example, they may function as a cushion which absorbs a pressure generated by the pressure-generating element so as to prevent the stable ejection of a droplet or to completely prevent the ejection of a droplet. Based on such findings, it has been found that by controlling the foaming power and foam stability of a recording liquid itself, specifically, by setting the foaming power and foam stability of the recording liquid simultaneously so as to be lower than predetermined levels, the problems described above can be overcome, and thus the present invention has been completed.

A recording liquid, a liquid cartridge, a liquid ejection cartridge, a liquid ejection apparatus, and a liquid ejection method to which the present invention is applied will be described below with reference to an ink-jet printer (hereinafter referred to as a "printer") 1 shown in FIG. 1. The printer 1 ejects ink or the like onto a recording sheet P travelling in a predetermined direction to print images and characters.

Figure 1:
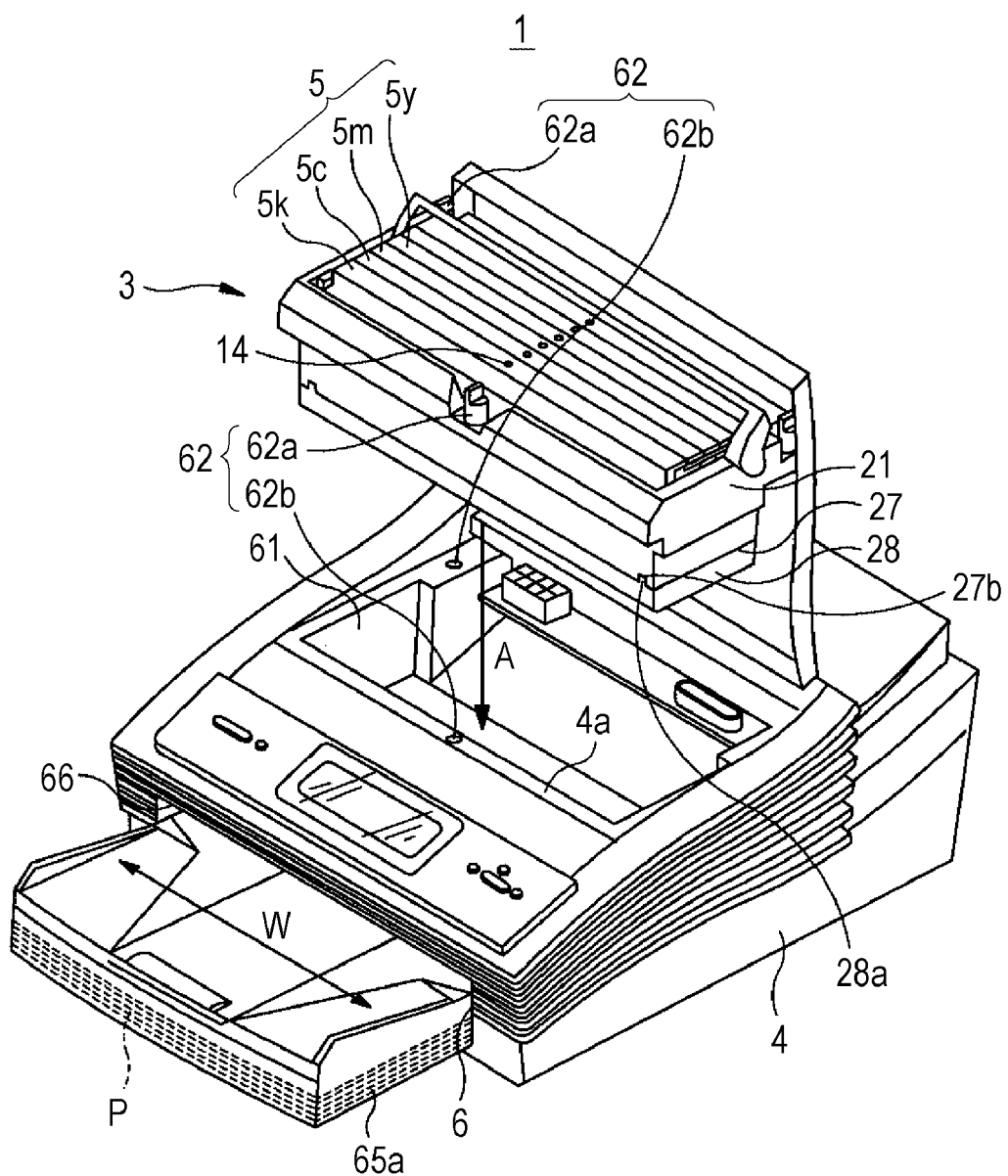
FIG. 1 is a perspective view which shows an ink-jet printer to which the present invention is applied.

In the printer 1, ink ejection ports (nozzles) are substantially linearly arrayed in parallel in the width direction of the recording sheet P, i.e., in the W direction in FIG. 1. The printer 1 is a line-type printer with high-speed ejection capability in which ink is ejected from each nozzle at an interval of about one five thousandth of a second to one ten thousandth of a second.

Figure 2:
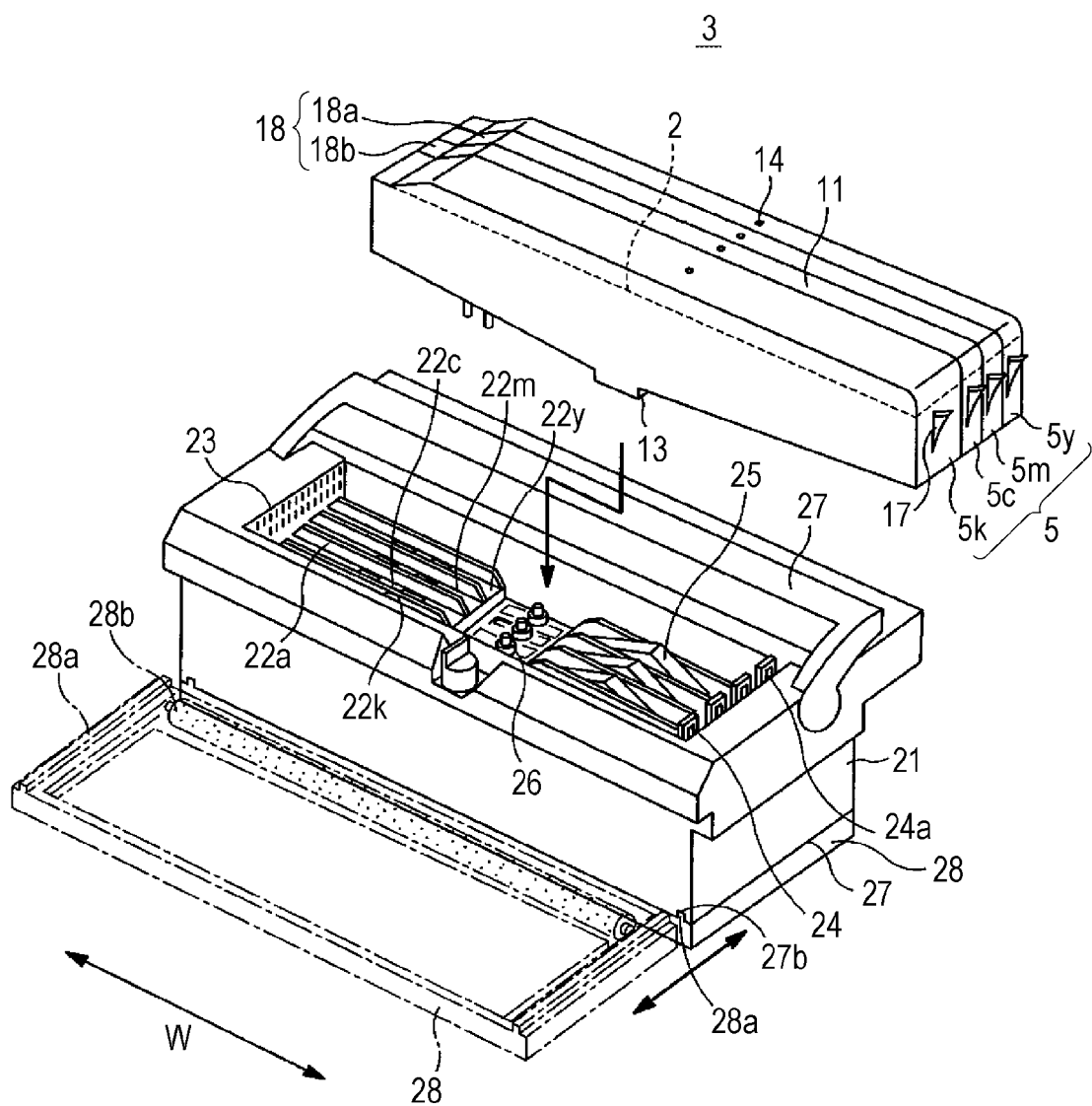
FIG. 2 is a perspective view which shows an ink-jet printer head cartridge provided in the ink-jet printer.
Figure 3:
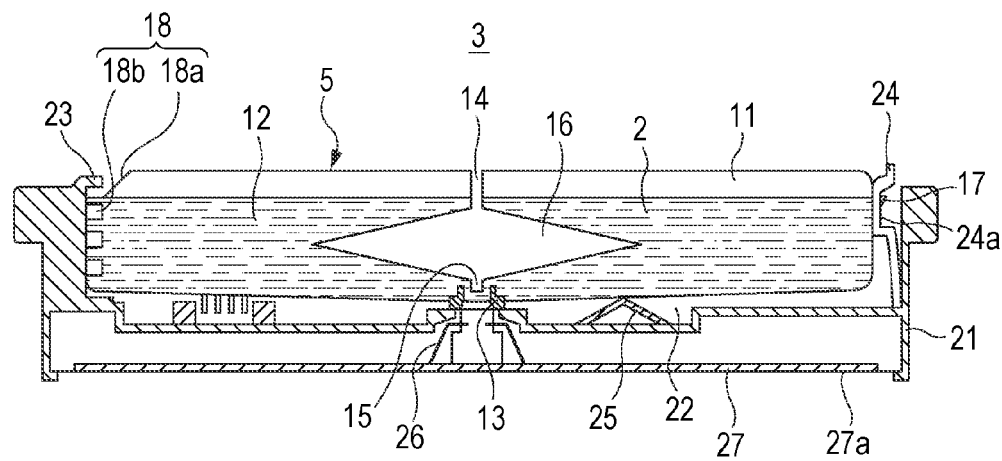
FIG. 3 is a sectional view of the ink-jet printer head cartridge.

As shown in FIGS. 2 and 3, the printer 1 includes an ink-jet printer head cartridge (hereinafter referred to as a "head cartridge") 3 which ejects at high speed an ink 2, i.e., a recording liquid, for recording images, characters, etc., on the recording sheet P, and a printer main body 4 in which the head cartridge 3 is installed.

In the printer 1, the head cartridge 3 is detachably installed in the printer main body 4, and ink cartridges 5y, 5m, 5c, and 5k, which function as ink supply sources and which are liquid cartridges containing the ink 2, are detachably installed in the head cartridge 3. In the printer 1, a yellow ink cartridge 5y, a magenta ink cartridge 5m, a cyan ink cartridge 5c, and a black ink cartridge 5k can be used. Furthermore, the head cartridge 3 detachable from the printer main body 4 and the ink cartridges 5y, 5m, 5c, and 5k detachable from the head cartridge 3 are replaceable parts.

In the printer 1, by installing a tray 65a which stores a stack of recording sheets P in a tray installation part 6 provided on the front bottom of the printer main body 4, the recording sheets P stored in the tray 65a can be fed into the printer main body 4. When the tray 65a is installed in the tray installation part 6 on the front face of the printer main body 4, a recording sheet P is fed toward the back face of the printer main body 4 from a paper feed port 65 by a paper feeding and discharging mechanism 64 (see FIG. 10). The travelling direction of the recording sheet P transported to the back side of the printer main body 4 is reversed by a reverse roller 83, which will be described later, and the recording sheet P is transported from the back side to the front side of the printer main body 4 above the approach route. By the time the recording sheet P is transported from the back side to the front side of the printer main body 4 to be discharged from a paper discharge port 66, the ink 2 is ejected at high speed onto the recording sheet P in accordance with printing data, such as character data and image data, inputted from an information processor 79, such as a personal computer, which will be described later, and characters and images in accordance with the printing data are printed at high speed.

The ink 2 which is a recording liquid in the high-speed printing is, for example, a mixed solution of a coloring agent, which is a coloring matter, such as a water-soluble dye or a pigment, a solvent for dispersing the coloring agent, and a nonionic surfactant.

As the coloring agent, a water-soluble dye, such as a direct dye, an acid dye, or a reactive dye, can be used.

Specific examples of a yellow direct dye include C.I. Direct Yellow 1, C.I. Direct Yellow 8, C.I. Direct Yellow 11, C.I. Direct Yellow 12, C.I. Direct Yellow 24, C.I. Direct Yellow 26, C.I. Direct Yellow 27, C.I. Direct Yellow 28, C.I. Direct Yellow 33, C.I. Direct Yellow 39, C.I. Direct Yellow 44, C.I. Direct Yellow 50, C.I. Direct Yellow 58, C.I. Direct Yellow 85, C.I. Direct Yellow 86, C.I. Direct Yellow 87, C.I. Direct Yellow 88, C.I. Direct Yellow 89, C.I. Direct Yellow 98, C.I. Direct Yellow 100, and C.I. Direct Yellow 110. These may be used alone or in combination.

Specific examples of a magenta direct dye include C.I. Direct Red 1, C.I. Direct Red 2, C.I. Direct Red 4, C.I. Direct Red 9, C.I. Direct Red 11, C.I. Direct Red 13, C.I. Direct Red 17, C.I. Direct Red 20, C.I. Direct Red 23, C.I. Direct Red 24, C.I. Direct Red 28, C.I. Direct Red 31, C.I. Direct Red 33, C.I. Direct Red 37, C.I. Direct Red 39, C.I. Direct Red 44, C.I. Direct Red 46, C.I. Direct Red 62, C.I. Direct Red 63, C.I. Direct Red 75, C.I. Direct Red 79, C.I. Direct Red 80, C.I. Direct Red 81, C.I. Direct Red 83, C.I. Direct Red 84, C.I. Direct Red 89, C.I. Direct Red 95, C.I. Direct Red 99, C.I. Direct Red 113, C.I. Direct Red 197, C.I. Direct Red 201, C.I. Direct Red 218, C.I. Direct Red 220, C.I. Direct Red 224, C.I. Direct Red 225, C.I. Direct Red 226, C.I. Direct Red 227, C.I. Direct Red 228, C.I. Direct Red 229, C.I. Direct Red 230, and C.I. Direct Red 321. These may be used alone or in combination.

Examples of a cyan direct dye include C.I. Direct Blue 1, C.I. Direct Blue 2, C.I. Direct Blue 6, C.I. Direct Blue 8, C.I. Direct Blue 15, C.I. Direct Blue 22, C.I. Direct Blue 25, C.I. Direct Blue 41, C.I. Direct Blue 71, C.I. Direct Blue 76, C.I. Direct Blue 77, C.I. Direct Blue 78, C.I. Direct Blue 80, C.I. Direct Blue 86, C.I. Direct Blue 90, C.I. Direct Blue 98, C.I. Direct Blue 106, C.I. Direct Blue 108, C.I. Direct Blue 120, C.I. Direct Blue 158, C.I. Direct Blue 160, C.I. Direct Blue 163, C.I. Direct Blue 165, C.I. Direct Blue 168, C.I. Direct Blue 192, C.I. Direct Blue 193, C.I. Direct Blue 194, C.I. Direct Blue 195, C.I. Direct Blue 196, C.I. Direct Blue 199, C.I. Direct Blue 200, C.I. Direct Blue 201, C.I. Direct Blue 202, C.I. Direct Blue 203, C.I. Direct Blue 207, C.I. Direct Blue 225, C.I. Direct Blue 226, C.I. Direct Blue 236, C.I. Direct Blue 237, C.I. Direct Blue 246, C.I. Direct Blue 248, and C.I. Direct Blue 249. These may be used alone or in combination.

Examples of a black direct dye include C.I. Direct Black 17, C.I. Direct Black 19, C.I. Direct Black 22, C.I. Direct Black 32, C.I. Direct Black 38, C.I. Direct Black 51, C.I. Direct Black 56, C.I. Direct Black 62, C.I. Direct Black 71, C.I. Direct Black 74, C.I. Direct Black 75, C.I. Direct Black 77, C.I. Direct Black 94, C.I. Direct Black 105, C.I. Direct Black 106, C.I. Direct Black 107, C.I. Direct Black 108, C.I. Direct Black 112, C.I. Direct Black 113, C.I. Direct Black 117, C.I. Direct Black 118, C.I. Direct Black 132, C.I. Direct Black 133, and C.I. Direct Black 146. These may be used alone or in combination.

Examples of a yellow acid dye include C.I. Acid Yellow 1, C.I. Acid Yellow 3, C.I. Acid Yellow 7, C.I. Acid Yellow 11, C.I. Acid Yellow 17, C.I. Acid Yellow 19, C.I. Acid Yellow 23, C.I. Acid Yellow 25, C.I. Acid Yellow 29, C.I. Acid Yellow 36, C.I. Acid Yellow 38, C.I. Acid Yellow 40, C.I. Acid Yellow 42, C.I. Acid Yellow 44, C.I. Acid Yellow 49, C.I. Acid Yellow 59, C.I. Acid Yellow 61, C.I. Acid Yellow 70, C.I. Acid Yellow 72, C.I. Acid Yellow 75, C.I. Acid Yellow 76, C.I. Acid Yellow 78, C.I. Acid Yellow 79, C.I. Acid Yellow 98, C.I. Acid Yellow 99, C.I. Acid Yellow 110, C.I. Acid Yellow 111, C.I. Acid Yellow 112, C.I. Acid Yellow 114, C.I. Acid Yellow 116, C.I. Acid Yellow 118, C.I. Acid Yellow 119, C.I. Acid Yellow 127, C.I. Acid Yellow 128, C.I. Acid Yellow 131, C.I. Acid Yellow 135, C.I. Acid Yellow 141, C.I. Acid Yellow 142, C.I. Acid Yellow 161, C.I. Acid Yellow 162, C.I. Acid Yellow 163, C.I. Acid Yellow 164, and C.I. Acid Yellow 165. These may be used alone or in combination.

Examples of a magenta acid dye include C.I. Acid Red 1, C.I. Acid Red 6, C.I. Acid Red 8, C.I. Acid Red 9, C.I. Acid Red 13, C.I. Acid Red 14, C.I. Acid Red 18, C.I. Acid Red 26, C.I. Acid Red 27, C.I. Acid Red 32, C.I. Acid Red 35, C.I. Acid Red 37, C.I. Acid Red 42, C.I. Acid Red 51, C.I. Acid Red 52, C.I. Acid Red 57, C.I. Acid Red 75, C.I. Acid Red 77, C.I. Acid Red 80, C.I. Acid Red 82, C.I. Acid Red 83, C.I. Acid Red 85, C.I. Acid Red 87, C.I. Acid Red 88, C.I. Acid Red 89, C.I. Acid Red 92, C.I. Acid Red 94, C.I. Acid Red 97, C.I. Acid Red 106, C.I. Acid Red 111, C.I. Acid Red 114, C.I. Acid Red 115, C.I. Acid Red 117, C.I. Acid Red 118, C.I. Acid Red 119, C.I. Acid Red 129, C.I. Acid Red 130, C.I. Acid Red 131, C.I. Acid Red 133, C.I. Acid Red 134, C.I. Acid Red 138, C.I. Acid Red 143, C.I. Acid Red 145, C.I. Acid Red 154, C.I. Acid Red 155, C.I. Acid Red 158, C.I. Acid Red 168, C.I. Acid Red 180, C.I. Acid Red 183, C.I. Acid Red 184, C.I. Acid Red 186, C.I. Acid Red 194, C.I. Acid Red 198, C.I. Acid Red 199, C.I. Acid Red 209, C.I. Acid Red 211, C.I. Acid Red 215, C.I. Acid Red 216, C.I. Acid Red 217, C.I. Acid Red 219, C.I. Acid Red 249, C.I. Acid Red 252, C.I. Acid Red 254, C.I. Acid Red 256, C.I. Acid Red 257, C.I. Acid Red 262, C.I. Acid Red 265, C.I. Acid Red 266, C.I. Acid Red 274, C.I. Acid Red 276, C.I. Acid Red 282, C.I. Acid Red 283, C.I. Acid Red 303, C.I. Acid Red 317, C.I. Acid Red 318, C.I. Acid Red 320, C.I. Acid Red 321, and C.I. Acid Red 322. These may be used alone or in combination.

Examples of a cyan acid dye include C.I. Acid Blue 1, C.I. Acid Blue 7, C.I. Acid Blue 9, C.I. Acid Blue 15, C.I. Acid Blue 22, C.I. Acid Blue 23, C.I. Acid Blue 25, C.I. Acid Blue 27, C.I. Acid Blue 29, C.I. Acid Blue 40, C.I. Acid Blue 41, C.I. Acid Blue 43, C.I. Acid Blue 45, C.I. Acid Blue 54, C.I. Acid Blue 59, C.I. Acid Blue 60, C.I. Acid Blue 62, C.I. Acid Blue 72, C.I. Acid Blue 74, C.I. Acid Blue 78, C.I. Acid Blue 80, C.I. Acid Blue 82, C.I. Acid Blue 83, C.I. Acid Blue 90, C.I. Acid Blue 92, C.I. Acid Blue 93, C.I. Acid Blue 100, C.I. Acid Blue 102, C.I. Acid Blue 103, C.I. Acid Blue 104, C.I. Acid Blue 112, C.I. Acid Blue 113, C.I. Acid Blue 117, C.I. Acid Blue 120, C.I. Acid Blue 126, C.I. Acid Blue 127, C.I. Acid Blue 129, C.I. Acid Blue 130, C.I. Acid Blue 131, C.I. Acid Blue 138, C.I. Acid Blue 140, C.I. Acid Blue 142, C.I. Acid Blue 143, C.I. Acid Blue 151, C.I. Acid Blue 154, C.I. Acid Blue 158, C.I. Acid Blue 161, C.I. Acid Blue 166, C.I. Acid Blue 167, C.I. Acid Blue 168, C.I. Acid Blue 170, C.I. Acid Blue 171, C.I. Acid Blue 175, C.I. Acid Blue 182, C.I. Acid Blue 183, C.I. Acid Blue 184, C.I. Acid Blue 187, C.I. Acid Blue 192, C.I. Acid Blue 199, C.I. Acid Blue 203, C.I. Acid Blue 204, C.I. Acid Blue 205, C.I. Acid Blue 229, C.I. Acid Blue 234, and C.I. Acid Blue 236. These may be used alone or in combination.

Examples of a black acid dye include C.I. Acid Black 1, C.I. Acid Black 2, C.I. Acid Black 7, C.I. Acid Black 24, C.I. Acid Black 26, C.I. Acid Black 29, C.I. Acid Black 31, C.I. Acid Black 44, C.I. Acid Black 48, C.I. Acid Black 50, C.I. Acid Black 51, C.I. Acid Black 52, C.I. Acid Black 58, C.I. Acid Black 60, C.I. Acid Black 62, C.I. Acid Black 63, C.I. Acid Black 64, C.I. Acid Black 67, C.I. Acid Black 72, C.I. Acid Black 76, C.I. Acid Black 77, C.I. Acid Black 94, C.I. Acid Black 107, C.I. Acid Black 108, C.I. Acid Black 109, C.I. Acid Black 110, C.I. Acid Black 112, C.I. Acid Black 115, C.I. Acid Black 118, C.I. Acid Black 119, C.I. Acid Black 121, C.I. Acid Black 122, C.I. Acid Black 131, C.I. Acid Black 132, C.I. Acid Black 139, C.I. Acid Black 140, C.I. Acid Black 155, C.I. Acid Black 156, C.I. Acid Black 157, C.I. Acid Black 158, C.I. Acid Black 159, and C.I. Acid Black 191. These may be used alone or in combination.

Examples of a yellow reactive dye include C.I. Reactive Yellow 1, C.I. Reactive Yellow 2, C.I. Reactive Yellow 3, C.I. Reactive Yellow 13, C.I. Reactive Yellow 14, C.I. Reactive Yellow 15, C.I. Reactive Yellow 17, C.I. Reactive Orange 2, C.I. Reactive Orange 5, C.I. Reactive Orange 7, C.I. Reactive Orange 16, C.I. Reactive Orange 20, and C.I. Reactive Orange 24. These may be used alone or in combination.

Examples of a magenta reactive dye include C.I. Reactive Red 6, C.I. Reactive Red 7, C.I. Reactive Red 11, C.I. Reactive Red 12, C.I. Reactive Red 13, C.I. Reactive Red 14, C.I. Reactive Red 15, C.I. Reactive Red 17, C.I. Reactive Red 21, C.I. Reactive Red 23, C.I. Reactive Red 24, C.I. Reactive Red 35, C.I. Reactive Red 36, C.I. Reactive Red 42, C.I. Reactive Red 63, C.I. Reactive Red 66, and C.I. Reactive Red 84. These may be used alone or in combination.

Examples of a cyan reactive dye include C.I. Reactive Blue 2, C.I. Reactive Blue 5, C.I. Reactive Blue 7, C.I. Reactive Blue 12, C.I. Reactive Blue 13, C.I. Reactive Blue 14, C.I. Reactive Blue 15, C.I. Reactive Blue 17, C.I. Reactive Blue 18, C.I. Reactive Blue 19, C.I. Reactive Blue 20, C.I. Reactive Blue 21, C.I. Reactive Blue 25, C.I. Reactive Blue 27, C.I. Reactive Blue 28, C.I. Reactive Blue 37, C.I. Reactive Blue 38, C.I. Reactive Blue 40, C.I. Reactive Blue 41, C.I. Reactive Green 5, and C.I. Reactive Green 7. These may be used alone or in combination.

In the ink 2, the coloring agent is added in an amount of 0.5% to 15% by weight, preferably 0.7% to 10% by weight, and the concentration of the coloring agent is determined depending on the type of object to be printed or the ejection method. Additionally, with respect to the ink 2, a higher concentration of the coloring agent is advantageous to viscosity control and long-term storage reliability.

As the solvent for dispersing the dye or the like described above, for example, water or the like which satisfies characteristics, such as low viscosity, ease of handling, low cost, and no odor, is used. As the solvent for the ink 2, in order to prevent unwanted ions from being mixed into the ink 2, for example, ion-exchanged water or the like may be used.

In addition to the solvent, such as water or ion-exchanged water, a water-soluble organic solvent, such as an aliphatic monohydric alcohol, an aliphatic polyhydric alcohol, or a derivative of aliphatic polyhydric alcohol, is also be incorporated into the ink 2.

Examples of the aliphatic monohydric alcohol include lower alcohols, such as methyl alcohol, ethyl alcohol, n-propyl alcohol, i-propyl alcohol, n-butyl alcohol, s-butyl alcohol, and tert-butyl alcohol. These may be used alone or in combination. When the aliphatic monohydric alcohol is used as the solvent, proper surface tension of the ink 2 can be achieved, and the resulting ink 2 has excellent permeation to the recording sheet P or the like, dot formation, and drying properties of images printed. Among the aliphatic monohydric alcohols, by using ethyl alcohol, i-propyl alcohol, or n-butyl alcohol as the solvent for the ink 2, it is possible to obtain the ink 2 which is particularly excellent in the characteristics described above.

Examples of the aliphatic polyhydric alcohol include alkylene glycols, such as ethylene glycol, diethylene glycol, triethylene glycol, propylene glycol, butylene glycol, and glycerol; polyalkylene glycols, such as polyethylene glycol, and polypropylene glycol; and thiodiglycols. These may be used alone or in combination.

Examples of the derivative of aliphatic polyhydric alcohol include lower alkyl ethers of the aliphatic polyhydric alcohols, such as ethylene glycol dimethyl ether; and lower carboxylic acid esters of the aliphatic polyhydric alcohols, such as ethylene glycol diacetate. When the aliphatic polyhydric alcohol or the derivative thereof is used as the solvent for the ink 2, the ink 2 becomes less easily dried and the ice point of the ink 2 can be decreased. Therefore, it becomes possible to inhibit changes in physical properties when the ink 2 is stored for a long period of time, and also it becomes possible to prevent the nozzles 55a from being clogged with dried ink 2.

Consequently, as the solvent for dispersing the dye, etc., by using, in addition to water or the like, one or a plurality of compounds selected from aliphatic monohydric alcohols, aliphatic polyhydric alcohols, and derivatives of aliphatic polyhydric alcohols, each having unique characteristics, it is possible to obtain the ink 2 suitable for the purpose or application.

Furthermore, in addition to the aliphatic monohydric alcohol, aliphatic polyhydric alcohol, or derivative of aliphatic polyhydric alcohol, one or a plurality of compounds selected from amides, such as dimethylformamide and dimethylacetamide; ketones, such as acetone and diacetone alcohol; keto-alcohols; and trihydric alcohols, such as tetrahydrofuran, dioxane, γ-butyrolactone, glycerol, and 1,2,6-hexanetriol; and nitrogen-containing heterocyclic compounds, such as diethanolamine, triethanolamine, sulfolane, 2-pyrrolidone, N-methyl-2-pyrrolidone, and 1,3-dimethyl-2-imidazolidinone, may also be added to the ink 2. Thereby, the various characteristics of the ink 2 can be improved.

The ink 2 contains an organic compound represented by Chemical Formula 1 below as a nonionic surfactant, in addition to the dye and the solvent described above.

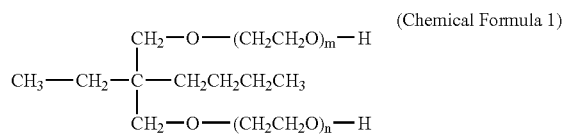

(Chemical Formula 1)

The nonionic surfactant represented by Chemical Formula 1, i.e., an ethylene oxide (hereinafter abbreviated as "EO") adduct of 3-ethyl-3-hydroxymethyl-heptanol, is a nonionic surfactant which can be relatively inexpensively manufactured on an industrial scale, for example, compared with an acetylenic glycol. Moreover, when the nonionic surfactant is added to the ink 2, the wettability to the recording sheet P is enhanced, and the foaming power and foam stability can be reduced. In Chemical Formula 1, each of m and n, i.e., the amount of EO added, is an integer of 1 or more. If either m or n is 0, the advantage of the present invention is not obtained. Furthermore, the sum of m and n, i.e., the total amount of EO added, is 30 or less, preferably 2 to 10, and more preferably 4 to 8. If the total amount of EO added exceeds 30, the surface tension is not easily decreased, which is undesirable.

Specifically, by adding the nonionic surfactant represented by Chemical Formula 1 to the ink 2, foaming power can be set in a range of 0 mm to 50 mm and foam stability can be set in a range of 0 mm to 50 mm, the foaming power and the foam stability being determined by substantially the same test method as that used to determine the foaming power and foam stability according to JIS-K3362.

The standard JIS-K3362 regulates a method for testing synthetic household detergents. In the test method used to determine the foaming power and foam stability according to this standard, 200 ml of a test aqueous solution having a predetermined concentration is allowed to fall from a height of 900 mm in 30 seconds onto a liquid surface under a predetermined temperature condition, and the height of the foam generated is measured. Namely, herein, 200 ml of ink 2 is allowed to fall from a height of 900 mm in 30 seconds onto a liquid surface in an atmosphere of about 25° C. to generate a foam, and the height of the foam from the liquid surface is measured. The height of the foam measured immediately after falling is defined as the foaming power, and the height of the foam measured 5 minutes after falling is defined as the foam stability.

The content of the nonionic surfactant is in a range of 0.05% to 10% by weight, preferably 0.1% to 5% by weight, based on the total amount of the ink 2. If the content of the nonionic surfactant is less than 0.05% by weight based on the total amount of the ink 2, it becomes difficult to enhance wettability to the recording sheet P. On the other hand, if the content of the nonionic surfactant exceeds 10% by weight based on the total amount of the ink 2, the ink 2 foams excessively, and it becomes difficult to obtain a predetermined foaming power and foam stability. Consequently, in order to obtain the ink 2 which has improved wettability to the recording sheet P and which is capable of reducing foaming, it is very important to set the content of the nonionic surfactant in a range of 0.05% to 10% by weight based on the total amount of the ink 2.

The ink 2 may contain, in addition to the nonionic surfactant described above, a surfactant prepared by mixing at least one of an ether, such as a polyoxyethylene alkyl ether or a polyoxyethylene alkyl phenyl ether; an ester, such as a polyoxyethylene fatty acid ester; a polyoxyethylene-polyoxypropylene copolymer; and a nitrogen-containing compound, such as a polyoxyethylene alkyl amine ether or a fatty acid diethanolamide, with a polyoxyethylene acetylene glycol.

In the ink 2 prepared by mixing the materials described above, since the foaming power is in a range of 0 mm to 50 mm and the foam stability is in a range of 0 mm to 50 mm, the foaming power and the foam stability being determined by substantially the same test method as that according to JIS-K3362, microscopic air bubbles can be inhibited from being produced in the liquid, and ejection stability can be prevented from being degraded.

Furthermore, in the ink 2, since the foaming power is in a range of 0 mm to 50 mm, the foam stability is in a range of 0 mm to 50 mm, and air bubbles are inhibited from being produced in the liquid, even if a heating resistor 58 (see FIG. 7), which will be described later, is driven with a pulsed current at a frequency of 5 kHz or more, it is possible to eject the ink 2 properly at high speed.

Furthermore, in addition to the coloring agent, the solvent, the nonionic surfactant, etc., described above, for example, other additives, such as a viscosity controller, a surface tension adjusting agent, a pH controller, a preservative, a rust preventive agent, and a fungicide, may be incorporated into the ink 2. Examples of the viscosity controller, the surface tension adjusting agent, and the pH controller include proteins, such as gelatin and casein; natural rubber, such as Arabic gum; cellulose derivatives, such as methyl cellulose, carboxymethyl cellulose, and hydroxymethyl cellulose; natural polymers, such as lignin sulfonate, and shellac; polyacrylic acid salts, styrene-acrylic acid copolymer salts, polyvinyl alcohol, and polyvinyl pyrrolidone. These may be used alone or in combination. Examples of the preservative, the rust preventive agent, the fungicide include benzoic acid, dichlorophene, hexachlorophene, sorbic acid, p-hydroxybenzoic acid esters, and ethylenediaminetetraacetic acid (EDTA). These may be used alone or in combination.

The ink 2 including the components as described above is prepared as follows. When the ink 2 which is a dissolved system including a dye or the like as a coloring agent is prepared, the coloring agent comprising the dye, a solvent, and a nonionic surfactant are mixed and stirred with a screw or the like while heating at 40° C. to 80° C. When the ink 2 is a dispersed system including a pigment or the like as a coloring agent, the pigment and a nonionic surfactant are dispersed in a solvent by a conventional pigment dispersion method, for example, using a dispersion apparatus, such as a ball mill, a sand mill, an attritor, a roll mill, an agitator, a Henschel mixer, a colloid mill, an ultrasonic homogenizer, a pearl mill, or a wet jet mill. In order to remove foreign matter, coarse particles, and contaminants, etc., the ink 2 thus prepared is subjected to pressure filtration treatment or filtration under reduced pressure at least once, centrifugation treatment using a centrifugal separator at least once, or combination of these treatments.

When the ink 2 is prepared as described above, in order to meet high-speed printing, and specifically, in order to allow the heating resistor 58, which will be described later, to be driven with a pulsed current at a frequency of 5 kHz or more, the surface tension of the ink 2 at 25° C. is adjusted to 30 mN/m to 60 mN/m, and preferably 30 mN/m to 40 mN/m. Furthermore, the viscosity of the ink 2 is controlled to, preferably 15 mPa·s or less, and more preferably 5 mPa·s or less.

With respect to the ink 2 thus prepared, as shown in FIGS. 2 and 3, yellow ink is contained in the ink cartridge 5y, magenta ink is contained in the ink cartridge 5m, cyan ink is contained in the ink cartridge 5c, and black ink is contained in the ink cartridge 5k.

Next, the head cartridge 3 detachable from the printer main body 4 which constitutes the printer 1, and the ink cartridges 5y, 5m, 5c, and 5k detachable from the head cartridge 3 will be described with reference to the drawings.

As shown in FIG. 1, the head cartridge 3 which performs printing on the recording sheet P is installed from above the printer main body 4, namely, in the A direction indicated in FIG. 1, and the ink 2 is ejected at high speed onto the recording sheet P which is allowed to travel by the paper feeding and discharging mechanism 64.

In the head cartridge 3, the ink 2 is formed into particulates by a pressure generated by a pressure-generating element which uses an electrothermal or electromechanical conversion system, and an ejection device sprays the ink 2 in the form of droplets onto the principal surface of an object, such as a recording sheet P. Specifically, as shown in FIGS. 2 and 3, the head cartridge 3 includes a cartridge main body 21, and the ink cartridges 5y, 5m, 5c, and 5k, which are containers filled with the ink 2, are installed in the cartridge main body 21. Hereinafter, the ink cartridge 5y, 5m, 5c, and 5k may also be referred to simply as the ink cartridge 5.

The ink cartridge 5 detachable from the head cartridge 3 includes a cartridge container 11 formed by injection molding of a resin material, such as polypropylene, which has strength and ink resistance. The cartridge container 11 has a substantially rectangular cross section with a longitudinal size that is substantially the same as the width of the recording sheet P used, and is designed so as to maximize the amount of ink stored therein.

The cartridge container 11 constituting the ink cartridge 5 includes an ink container section 12 for containing the ink 2, an ink supply section 13 for supplying the ink 2 from the ink container section 12 to the cartridge main body 21 of the head cartridge 3, a communicating opening 14 for taking air from outside into the ink container section 12, an air introduction passage 15 for introducing the air taken through the communicating opening 14 into the ink container section 12, a storage section 16 for temporarily store the ink 2 between the communicating opening 14 and the air introduction passage 15, and a locking protrusion 17 and an engaging step 18 for locking the ink cartridge 5 in the cartridge main body 21.

The ink container section 12 is composed of a highly airtight material and forms a space for containing the ink 2. The ink container section 12 has a substantially rectangular cross section with a longitudinal size that is substantially the same as the width of the recording sheet P used.

The ink supply section 13 is disposed on substantially the center of the lower side of the ink container section 12. The ink supply section 13 is a nozzle which communicates with the ink container section 12 and which is substantially protruding. The end of the nozzle is fitted into a connecting section 26, which will be described later, of the head cartridge 3, and thereby the cartridge container 11 of the ink cartridge 5 and the cartridge main body 21 of the head cartridge 3 are connected to each other. The ink 2 is supplied from the ink cartridge 5 which is an ink container section through the ink supply section 13 to the cartridge main body 21 provided with the ejection device.

The communicating opening 14 is a vent for taking air from outside of the ink cartridge 5 into the ink container section 12. The communicating opening 14 is disposed at a predetermined position of the upper surface of the cartridge container 11, herein, on substantially the center of the upper surface, which faces outside when the ink cartridge 5 is mounted on the mounting section 22 of the head cartridge 3, so that it is possible to take air from outside even when the ink cartridge 5 is mounted on the mounting section 22 of the head cartridge 3. When the ink cartridge 5 is installed in the cartridge main body 21 and the ink 2 is allowed to flow from the ink container section 12 to the cartridge main body 21, the communicating opening 14 takes air from outside into the ink cartridge 5 in an amount corresponding to the volume of the ink 2 decreased in the ink container section 12.

The air introduction passage 15 connects between the ink container section 12 and the communicating opening 14, and introduces air taken from the communicating opening 14 into the ink container section 12. Thereby, when the ink cartridge 5 is installed in the cartridge main body 21 and when the ink 2 is supplied to the cartridge main body 21 of the head cartridge 3, even if the amount of the ink 2 in the ink container section 12 is decreased to cause a reduced pressure inside, air is introduced into the ink container section 12 through the air introduction passage 15. Therefore, the internal pressure is maintained in an equilibrium, and the ink 2 can be properly supplied to the cartridge main body 21.

The storage section 16 is disposed between the communicating opening 14 and the air introduction passage 15. When the ink 2 leaks out of the air introduction passage 15 which communicates with the ink container section 12, the storage section 16 temporarily stores the ink 2 so as to prevent the ink 2 from immediately flowing out to the outside. The storage section 16 has a substantially rhombic cross section with the longer diagonal being directed in the longitudinal direction of the ink container section 12. The air introduction passage 15 is disposed on the lowest bottom namely, on the lower end of the shorter diagonal, of the ink container section 12, so that the ink 2 entering from the ink container section 12 can be returned to the ink container section 12. Furthermore, the communicating opening 14 is disposed on the higher end of the shorter diagonal, so that the ink 2 entering from the ink container section 12 does not easily leak out through the communicating opening 14.

The locking protrusion 17 is a protrusion disposed on a short side of the ink cartridge 5 and is brought into engagement with an engaging hole 24a formed in a latch lever 24 of the cartridge main body 21 of the head cartridge 3. The locking protrusion 17 has an upper surface that is substantially perpendicular to the side face of the ink container section 12 and a lower surface that inclines from the end toward the upper surface.

The engaging step 18 is disposed on the upper portion of a side face of the ink cartridge 5 opposite to the side face provided with the locking protrusion 17. The engaging step 18 includes an inclined plane 18a having an end in contact with the upper surface of the cartridge container 11 and a plane 18b that continues to the other end of the inclined plane 18a and is substantially parallel with the upper surface. Since the ink cartridge 5 is provided with the engaging step 18, the height of the side face provided with the plane 18b is one step lower than the upper surface of the cartridge container 11. The engaging step 18 is brought into engagement with an engaging part 23 of the cartridge main body 21. The engaging step 18 is provided on the side face that is inserted into the mounting section 22 of the head cartridge 3, and by engaging with the engaging part 23 on the mounting section 22 side, the engaging step 18 serves as a fulcrum for rotation when the ink cartridge 5 is mounted on the mounting section 22.

The ink cartridge 5 having the structure described above is also provided with, for example, an ink remaining amount detection unit for detecting the remaining amount of the ink 2 in the ink container section 12 and an identification unit for identifying the ink cartridges 5y, 5m, 5c, and 5k.

Next, the head cartridge 3 in which the ink cartridges 5y, 5m, 5c, and 5k respectively containing the ink 2 of yellow, magenta, cyan, and black will be described below.

As shown in FIGS. 2 and 3, the head cartridge 3 includes the ink cartridge 5 and the cartridge main body 21, and the cartridge main body 21 includes mounting sections 22y, 22m, 22c, and 22k (hereinafter, also simply referred to as a "mounting section 22" when indicating the whole mounting section) on which the ink cartridge 5 is mounted, the engaging part 23 for fixing the ink cartridge 5, a force-applying member 25 for applying force to the latch lever 24 and the ink cartridge 5 in the detaching direction, the connecting section 26 which is connected to the ink supply section 13 and to which the ink 2 is supplied, an ink ejection head 27 for ejecting the ink 2, and a head cap 28 for protecting the ink ejection head 27.

The mounting section 22 on which the ink cartridge 5 is mounted has a substantially concave cross section with an upper surface being used as an attaching opening so that the ink cartridge 5 can be installed. Herein, four ink cartridges are arrayed in a direction substantially perpendicular to the width direction of the recording sheet P, namely, in the traveling direction of the recording sheet P. Since the mounting section 22 contains the ink cartridge 5, the longitudinal side corresponds to the printing width direction as in the ink cartridge 5. The ink cartridge 5 is installed and contained in the cartridge main body 21.

As shown in FIG. 2, the mounting section 22 is a section on which the ink cartridge 5 is mounted. The yellow ink cartridge 5y is mounted on a mounting section 22y, the magenta ink cartridge 5m is mounted on a mounting section 22m, the cyan ink cartridge 5c is mounted on a mounting section 22c, and the black ink cartridge 5k is mounted on a mounting section 22k. The individual mounting sections 22y, 22m, 22c, and 22k are delimited from each other with partitions 22a.

As shown in FIG. 3, the engaging part 23 is provided to an open end of the mounting section 22 on which the ink cartridge 5 is mounted. The engaging part 23 is disposed on one edge in the longitudinal direction of the mounting section 22, and is brought into engagement with the engaging step 18 of the ink cartridge 5. In order to mount the ink cartridge 5 on the mounting section 22, the engaging step 18 side of the ink cartridge 5 as the inserting end is obliquely inserted into the mounting section 22, and the other side of the ink cartridge 5 not provided with the engaging step 18 is rotated toward the mounting section 22 with the engaging position between the engaging step 18 and the engaging part 23 serving as a fulcrum for rotation. Thereby, the ink cartridge 5 can be easily mounted on the mounting section 22.

The latch lever 24 is formed by bending a leaf spring, and is provided on the side of the mounting section 22 opposite to the engaging part 23, namely, on the other side in the longitudinal direction. The base of the latch lever 24 is integrally provided on the bottom of the other side in the longitudinal direction of the mounting section 22, and the head of the latch lever 24 is formed so as to be elastically deformed in a direction slightly separating from this side. The engaging hole 24a is formed on the head. The latch lever 24 is elastically deformed once the ink cartridge 5 is mounted on the mounting section 22, and the engaging hole 24a is brought into engagement with the locking protrusion 17 of the ink cartridge 5, thus preventing the ink cartridge 5 from being detached from the mounting section 22.

The force-applying member 25 is disposed on the bottom of the mounting section 22 on the side opposite to the engaging step 18 and formed by bending a leaf spring so that force is applied to detach the ink cartridge 5. The force-applying member 25, which is an ejecting member, has a top formed by bending and is elastically deformed in a direction slightly separating from the bottom surface, and the top of the force-applying member 25 presses the bottom of the ink cartridge 5, thus applying force to detach the ink cartridge 5 from the mounting section 22. When engagement between the engaging hole 24a of the latch lever 24 and the locking protrusion 17 is released, the force-applying member 25 ejects the ink cartridge 5 from the mounting section 22.

The connecting section 26 is provided substantially on the center of each of the mounting sections 22y, 22m, 22c, and 22k. When the ink cartridges 5y, 5m, 5c, and 5k are mounted on the mounting sections 22y, 22m, 22c, and 22k, respectively, the ink supply section 13 of each of the ink cartridge 5y, 5m, 5c, and 5k is connected to the connecting section 26. The connecting section 26 serves as an ink supply channel which supplies ink 2 from the ink supply section 13 of the ink cartridge 5 mounted on the mounting section 22 to an ink ejection head 27 provided on the bottom surface of the cartridge main body 21.

Figure 4:
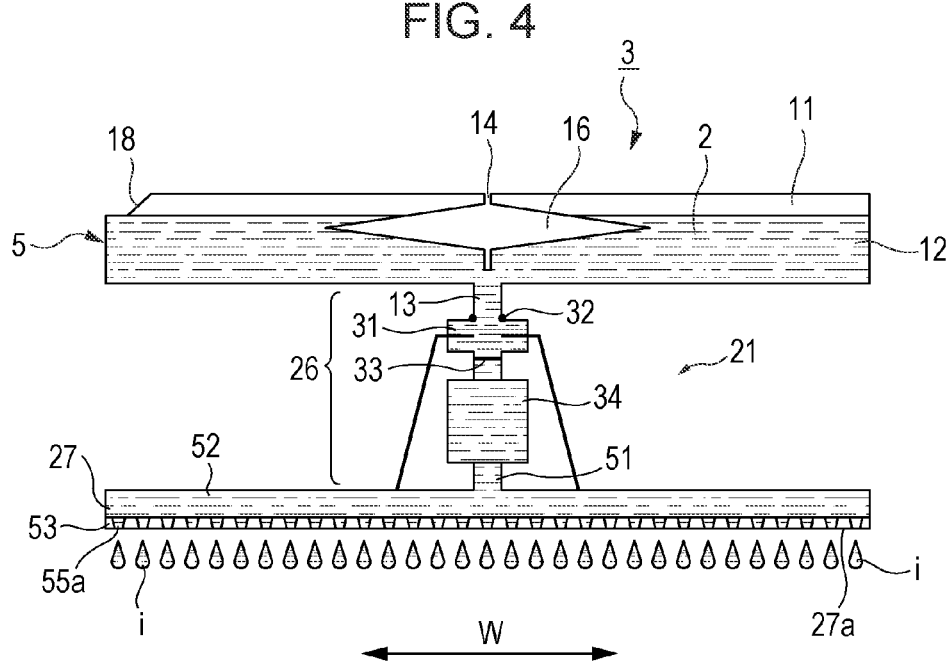
FIG. 4 is a schematic diagram which shows the relationship between an ink cartridge and a cartridge main body in the ink-jet printer head cartridge.

As shown in FIG. 4, the connecting section 26 includes an ink reservoir 31 for storing the ink 2 supplied from the ink cartridge 5, a sealing member 32 for sealing the ink supply section 13 linked to the connecting section 26, a filter 33 for removing impurities from the ink 2, and a valve system 34 for opening and closing the supply channel to the ink ejection head 27.

The ink reservoir 31 is a space connected to the ink supply section 13 and stores the ink 2 supplied form the ink cartridge 5. The sealing member 32 is provided on the upper end of the ink reservoir 31, and seals between the ink reservoir 31 and the ink supply section 13 so as to prevent the ink 2 from leaking to the outside when the ink supply section 13 of the ink cartridge 5 is connected to the ink reservoir 31 of the connecting section 26. The filter 33 removes foreign matter, such as dust or dirt, mixed into the ink 2 during insertion and withdrawal of the ink cartridge 5, and is disposed downstream of the ink reservoir 31.

Figure 5A:
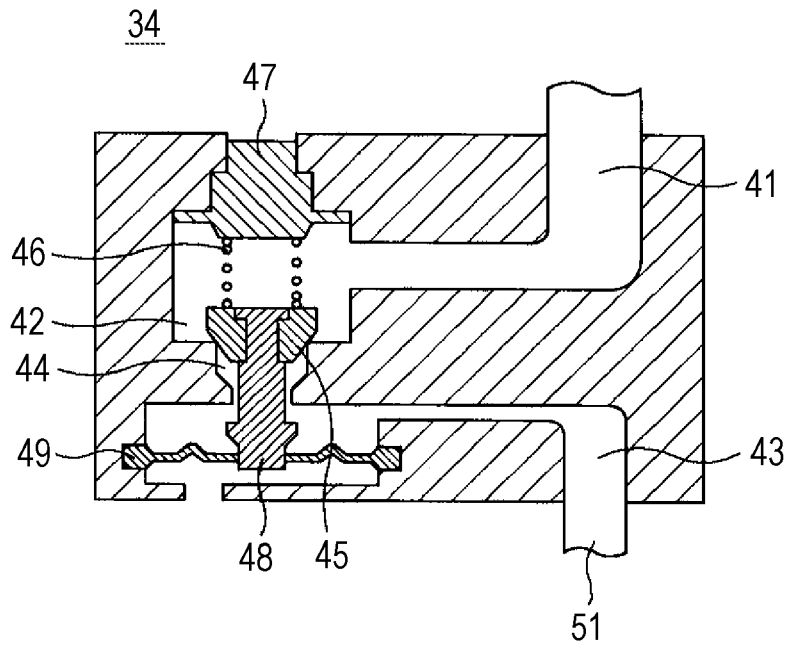
FIG. 5A is a sectional view of a valve system at a connecting section of the ink-jet printer head cartridge, in which the valve is closed.
Figure 5B:
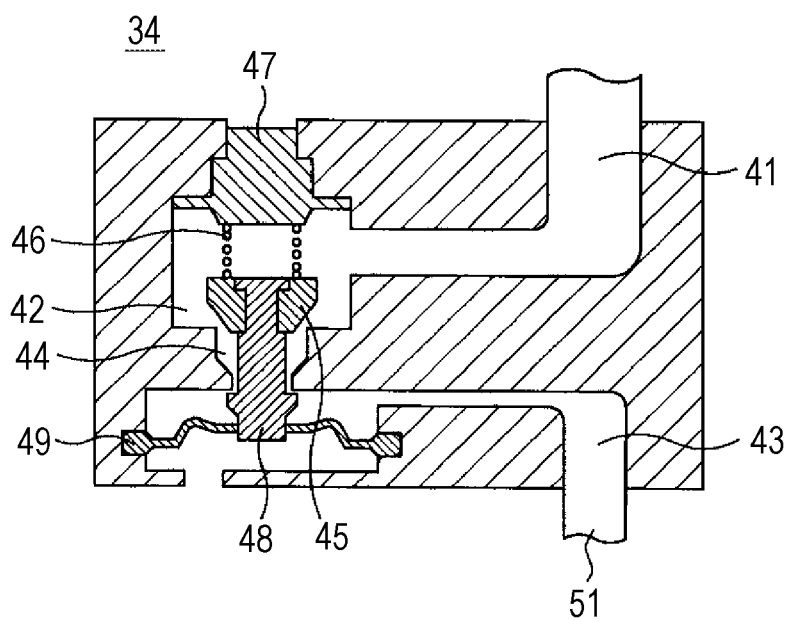
FIG. 5B is a sectional view of a valve system at a connecting section of the ink-jet printer head cartridge, in which the valve is open.

As shown in FIGS. 5A and 5B, the valve system 34 includes an ink inflow channel 41 to which the ink 2 is supplied from the ink reservoir 31, an ink chamber 42 into which the ink 2 flows through the ink inflow channel 41, an ink outflow channel 43 for allowing the ink 2 to flow out of the ink chamber 42, an opening 44 disposed in the ink chamber 42 between the ink inflow channel 41 side and the ink outflow channel 43 side, a valve 45 for opening and closing the opening 44, a force-applying member 46 for applying force to the valve 45 in a direction in which the opening 44 closes, a negative pressure adjusting screw 47 for adjusting the strength of the force-applying member 46, a valve shaft 48 connected to the valve 45, and a diaphragm 49 connected to the valve shaft 48.

The ink inflow channel 41 is a supply channel linked to the ink container section 12 through the ink reservoir 31 so that the ink 2 in the ink container section 12 of the ink cartridge 5 can be supplied to the ink ejection head 27. The ink inflow channel 41 extends from the bottom of the ink reservoir 31 to the ink chamber 42. The ink chamber 42 is a substantially rectangular parallelepiped space section integrally formed with the ink outflow channel 43 and the opening 44. The ink 2 flows from the ink inflow channel 41 into the ink chamber 42 and flows out through the opening 44 from the ink outflow channel 43. The ink outflow channel 43 is a supply channel to which the ink 2 is supplied from the ink chamber 42 through the opening 44 and which is linked to the ink ejection head 27. The ink outflow channel 43 extends from the bottom of the ink chamber 42 to the ink ejection head 27.

The valve 45 is disposed in the ink chamber 42 and closes the opening 44 to divide the ink chamber 42 into the ink inflow channel 41 side and the ink outflow channel 43 side. The valve 45 is allowed to move up and down by the force applied by the force-applying member 46, the restoring force of the diaphragm 49 connected through the valve shaft 48, and the negative pressure of the ink 2 on the ink outflow channel 43 side. When the valve 45 is positioned at the lower end, the valve 45 closes the opening 44 so that the ink chamber 42 is divided into the ink inflow channel 41 side and the ink outflow channel 43 side, thus blocking the supply of the ink 2 to the ink outflow channel 43. When the valve 45 is positioned at the upper end against the force applied by the force-applying member 46, the valve 45 allows the ink 2 to be supplied to the ink ejection head 27 without dividing the ink chamber 42 into the ink inflow channel 41 side and the ink outflow channel 43 side. Additionally, the valve 45 may be composed of any type of material. In order to ensure high blocking properties, the valve 45 is, for example, composed of a rubber elastic material, i.e., an elastomer or the like.

The force-applying member 46 is, for example, a compression spring. The force-applying member 46 connects the negative pressure adjusting screw 47 and the valve 45 between the upper surface of the valve and the upper surface of the ink chamber 42, and applies force to the valve 45 in a direction in which the opening 44 is closed. The negative pressure adjusting screw 47 adjusts the force applied by the force-applying member 46, and by adjusting the negative pressure adjusting screw 47, the force applied by the force-applying member 46 can be adjusted. Thereby, the negative pressure adjusting screw 47 can adjust the negative pressure of the ink 2 which opens and closes the opening 44, of which details will be described later.

The valve shaft 48 is provided so that the valve 45 connected to the one end thereof and the diaphragm 49 connected to the other end thereof can move together. The diaphragm 49 is a thin elastic plate connected to the end of the valve shaft 48. The diaphragm 49 includes a first principal surface facing the ink outflow channel 43 side of the ink chamber 42 and a second principal surface in contact with outside air. The diaphragm 49 is elastically deformed toward the outside air or the ink outflow channel 43 side by the atmospheric pressure and the negative pressure of the ink 2.

In the valve system 34, as shown in FIG. 5A, the valve 45 is pressed by the force applied by the force-applying member 46 and the force applied by the diaphragm 49 so that the opening 44 of the ink chamber 42 is closed. When the ink 2 is ejected from the ink ejection head 27 and when the negative pressure of the ink 2 in the ink outflow channel 43 side of the ink chamber 42 divided by the opening 44 is increased, as shown in FIG. 5B, the diaphragm 49 is pushed up by the atmospheric pressure due to the negative pressure of the ink 2, and the valve 45 together with the valve shaft 48 is pushed up against the force applied by the force-applying member 46. At this stage, the opening 44 between the ink inflow channel 41 side and the ink outflow channel 43 side in the ink chamber 42 is opened, and the ink 2 is supplied from the ink inflow channel 41 side to the ink outflow channel 43 side. As a result, the negative pressure of the ink 2 is decreased, and the diaphragm 49 regains the original shape due to its restoring force, and the valve 45 together with the valve shaft 48 is pushed down by the force applied by the force-applying member 46 so that the ink chamber 42 is closed.

In the valve system 34, if the negative pressure of the ink 2 is increased whenever the ink 2 is ejected, the operation described above is repeated.

In the connecting section 26, when the ink 2 in the ink container section 12 is supplied to the ink chamber 42, the amount of the ink 2 in the ink container section 12 is decreased, and at this stage, outside air enters the ink cartridge 5 through the air introduction passage 15. The air entering the ink cartridge 5 goes upward. Thereby, the state before an ink droplet i is ejected from a nozzle 55a, which will be described later, is restored to achieve an equilibrium. At this stage, there is substantially no ink 2 in the air introduction passage 15.

The connecting section 26 has a complex structure as described above, and the ink 2 moves through the complex channel. In the ink 2, since the foaming power is set in a range of 0 mm to 50 mm and the foam stability is set in a range of 0 mm to 50 mm, the foaming power and the foam stability being determined by substantially the same test method as that according to JIS-K3362, microscopic air bubbles can be inhibited from being produced in the ink 2, and the ink 2 in which microscopic air bubbles are not mixed is supplied to the ink ejection head 27.

As shown in FIG. 4, the ink ejection head 27 is disposed along the bottom surface of the cartridge main body 21. The nozzles 55a functioning as ink ejection ports for ejecting ink droplets i supplied from the connecting section 26, which will be described later, are arrayed in the width direction of the recording sheet P, namely, in the W direction indicated by the arrow in FIG. 4, substantially linearly for each color.

As shown in FIG. 2, the head cap 28 is a cover provided to protect the ink ejection head 27. When the printing operation is performed, the head cap 28 is placed aside the ink ejection head 27. The head cap 28 includes a pair of engaging protrusions 28a provided on both ends in the W direction of the head cap 28 shown in FIG. 2, the engaging protrusions 28a extending the opening and closing direction, and a cleaning roller 28b which is disposed in the longitudinal direction and which absorbs excess ink adhering to the ejection surface 27a of the ink ejection head 27.

The engaging protrusions 28a of the head cap 28 are brought into engagement with a pair of engaging slots 27b provided on the ejection surface 27a of the ejection head 27 in a direction substantially perpendicular to the W direction shown in FIG. 2. The head cap 28 is allowed to open or close along the pair of engaging slots 27b in the latitudinal direction of the ink cartridge 5, namely, in a direction substantially perpendicular to the W direction.

In the head cap 28, during the opening and closing operation, the cleaning roller 28b rotates in contact with the ejection surface 27a of the ink ejection head 27 to absorb excess ink 2 remaining on the ejection surface 27a, thus cleaning the ejection surface 27a of the ink ejection head 27. The cleaning roller 28b is composed of, for example, a highly hygroscopic material, such as sponge, unwoven fabric, or woven fabric. When the printing operation is not performed, the head cap 28 covers the ejection surface 27a so that the ink 2 in the ink ejection head 27 is prevented from being dried.

The head cartridge 3 having the structure described above further includes, for example, a remaining amount detection unit for detecting the remaining amount of ink in the ink cartridge 5 and an ink detection unit for detecting the presence or absence of the ink 2 when the ink supply section 13 is connected to the connecting section 26.

As shown in FIG. 4, the ink ejection head 27 includes an ink supply port 51 which is placed above the ejection surface 27a and to which the ink 2 is supplied through the ink outflow channel 43 of the valve system 34, and an ink passage 52 which guides the ink 2 supplied from the ink supply port 51 to the individual nozzles 55a.

The ink supply port 51 is provided in the center of the upper surface of the ink passage 52 and communicates with the valve system 34.

The ink passage 52 extends over a length corresponding to the width of the recording sheet and is provided substantially linearly so that the ink 2 is supplied to the nozzles 55a of each color, which will be described later.

In the ink ejection head 27, head chips 53 including a predetermined number of nozzles 55a, which will be described later, are arranged in a staggered manner for each color. Namely, as shown in FIG. 6, the head chips 53 are arranged so as to alternately align with the ink passage 52 therebetween in the width direction of the recording sheet P for each color.

Figure 7:
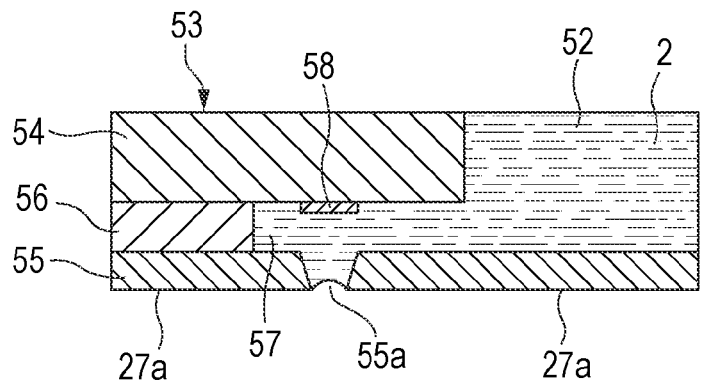
FIG. 7 is a sectional view which shows a head chip of the ink-jet printer head cartridge.

As shown in FIG. 7, the head chip 53 includes a circuit board 54 functioning as a base, a nozzle sheet 55 provided with a plurality of nozzles 55a, a film 56 which delimits between the circuit board 54 and the nozzle sheet 55 for each nozzle 55a, an ink liquid chamber 57 which presses the ink 2 supplied through the ink passage 52, and a heating resistor 58 for heating the ink 2 supplied to the ink liquid chamber 57, and the head chip 53 is an ejection device which ejects ink droplets i from the nozzles 55a.

In the circuit board 54, a control circuit including a logic integrated circuit (IC), a driver transistor, etc., is disposed on a semiconductor wafer composed of silicon or the like, and the circuit board 54 constitutes the upper surface of the ink liquid chamber 57.

The nozzle sheet 55 is provided with nozzles 55a for ejecting ink droplets i and has a thickness of about 10 μm to 15 μm. The nozzle sheet 55 is disposed on a surface of the film 56 opposite to the surface in contact with the circuit board 54. Each nozzle 55a is a micropore having a circular cross section with a diameter of about 10 μm to 20 μm and is disposed so as to face a heating resistor 58. Ink droplets i with a microscopic volume of about 10 pl or less is ejected from the micropore. The nozzle sheet 55 constitutes a part of the ink liquid chamber 57.

The film 56 is, for example, composed of a photo-curable dry film resist, and is disposed so as to surround each nozzle 55a except for the portion connected to the ink passage 52. The film 56 is disposed between the circuit board 54 and the nozzle sheet 55, thus constituting the side face of the ink liquid chamber 57.

The ink liquid chamber 57 is surrounded with the circuit board 54, the nozzle sheet 55, and the film 56, and thus a space for pressing the ink 2 supplied from the ink passage 52 is formed for each nozzle 55a.

The heating resistor 58 is disposed on the circuit board 54 facing the ink liquid chamber 57, and is electrically connected to the control circuit of the circuit board 54. The heating resistor 58 heats the ink 2 in the ink liquid chamber 57 under the control of the control circuit.

In the head chip 53, the control circuit of the circuit board 54 controls the heating resistor 58, and a pulsed current is applied, for example, only for about 1 to 3 microseconds, to the selected heating resistor 58. Thereby, the heating resistor 58 is rapidly heated. An air bubble is then generated in the ink 2 in the ink liquid chamber 57 which is in contact with the heating resistor 58. In the ink liquid chamber 57, the air bubble presses the ink 2 while expanding, and a pushed down droplet of ink 2 is ejected from the nozzle 55a. After the droplet of ink 2 is ejected, the ink 2 is supplied to the ink liquid chamber 57 through the ink passage 52, and the state before ejection is restored.

Specifically, when the ink 2 is rapidly heated by the heating resistor 58, the temperature of the ink 2 rapidly increases exceeding the boiling point. When the ink temperature is increased to about 300° C. to reach the spontaneous nucleation temperature, countless air bubbles b are generated in a moment on the heating resistor 58. In the ink liquid chamber 57, excess energy in the ink 2 is released at a blast to increase the inner pressure of the air bubble b.

Figure 8:
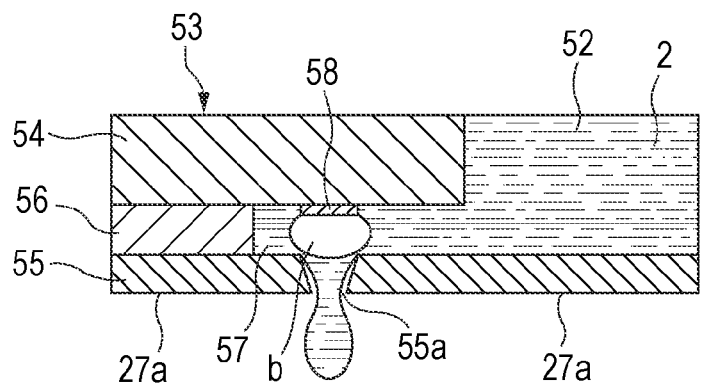
FIG. 8 is a sectional view showing the state in which the head chip ejects an ink droplet and in which an ink air bubble is formed in an ink liquid chamber.
Figure 9:
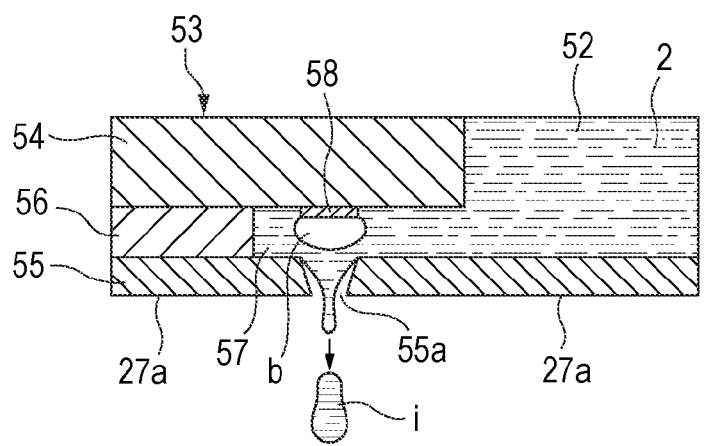
FIG. 9 is a sectional view showing the state in which the head chip ejects an ink droplet and in which the ink droplet is ejected from a nozzle by the ink air bubble.

The ink air bubble b rapidly grows as shown in FIG. 8. The ink 2 in the ink liquid chamber 57 then protrudes from the nozzle 55a because of the impetus of growth of the ink air bubble b, and the ink air bubble b contracts because the pressure is reduced as it expands, as shown in FIG. 9. In the ink 2 protruding from the nozzle 55a, the tail extending out is cut because of its inertia and the contraction of the air bubble b, and thus a droplet i of ink with a volume of 10 pl or less is ejected from the nozzle 55a.

The air bubble b in the ink liquid chamber 57 then collapses on the heating resistor 58. In the ink liquid chamber 57, the same amount of ink 2 as that ejected from the nozzle 55a is supplied from the ink passage 52 due to the capillary attraction of the nozzle 55a in which the original meniscus is attempted to be recovered. In the head chip 53, the ink 2 is ejected from the nozzle 55a as described above.

In order to produce the head chip 53, the film 53 is formed entirely over a principal surface of the circuit board 54, the film 53 is formed into a shape corresponding to the ink liquid chamber 57 using photolithography, and the nozzle sheet 52 is deposited thereon. In the head chip 53, an electrothermal conversion system in which the ink 2 is ejected while heating the ink 2 with the heating resistor 58 is employed. The present invention is not limited to such a system. For example, an electromechanical conversion system in which droplets of ink 2 are electromechanically ejected with an electromechanical converting element, such as a piezoelectric element, may be employed.

The ink ejection heads 27 corresponding to the individual colors are disposed below the ink supply sections 13 corresponding the respective colors. On the bottom surface of the cartridge main body 21, the ejection surfaces 27a of the ink ejection heads 27 of the individual colors are aligned in the latitudinal direction of the cartridge main body 21, thus forming a continuous ejection surface 27a. Namely, the head cartridge 3 has a multi-line head in which the ink ejection heads 27 corresponding to the individual colors are integrated to form the continuous ejection surface 27a.

The ink ejection head 27 is provided with about 100 to 5,000 nozzles 55a for each color, and about 400 to 20,000 nozzles 55a in total are provided on the ejection surface 27a.

In the ink ejection head 27, the control circuit of the circuit board 54 controls the heating resistor 58 so as to be driven with a pulsed current at about 5 kHz to 10 kHz. It is possible to perform high-speed ejection in which ink droplets i with microscopic volume are ejected from the nozzles 55a at an interval of about one five thousandth of a second to one ten thousandth of a second.

In the ink ejection head 27 having the structure described above, since the plurality of heating resistors 58 are provided, the number of heating points for the ink 2 is increased and microscopic air bubbles are believed to be easily generated. However, in the ink 2, since the foaming power is set in a range of 0 mm to 50 mm and the foam stability is set in a range of 0 mm to 50 mm, microscopic air bubbles can be inhibited from being produced in the ink 2, and thus it is possible to prevent degradation in ejection stability due to air bubbles.

In the ink ejection head 27, since microscopic air bubbles are inhibited from being produced in the ink 2 in the ink liquid chamber 57, even if the heating resistors 58 are driven with a pulsed current at a frequency of 5 kHz or more and ink droplets i with a volume of 10 pl or less are ejected from the ejection ports, namely, even if high-speed ejection is performed, it is possible to eject ink droplets i with excellent ejection stability.

The printer main body 4 constituting the printer 1 in which the head cartridge 3 having the structure described above is installed will be described below with reference to the drawings.

Figure 10:
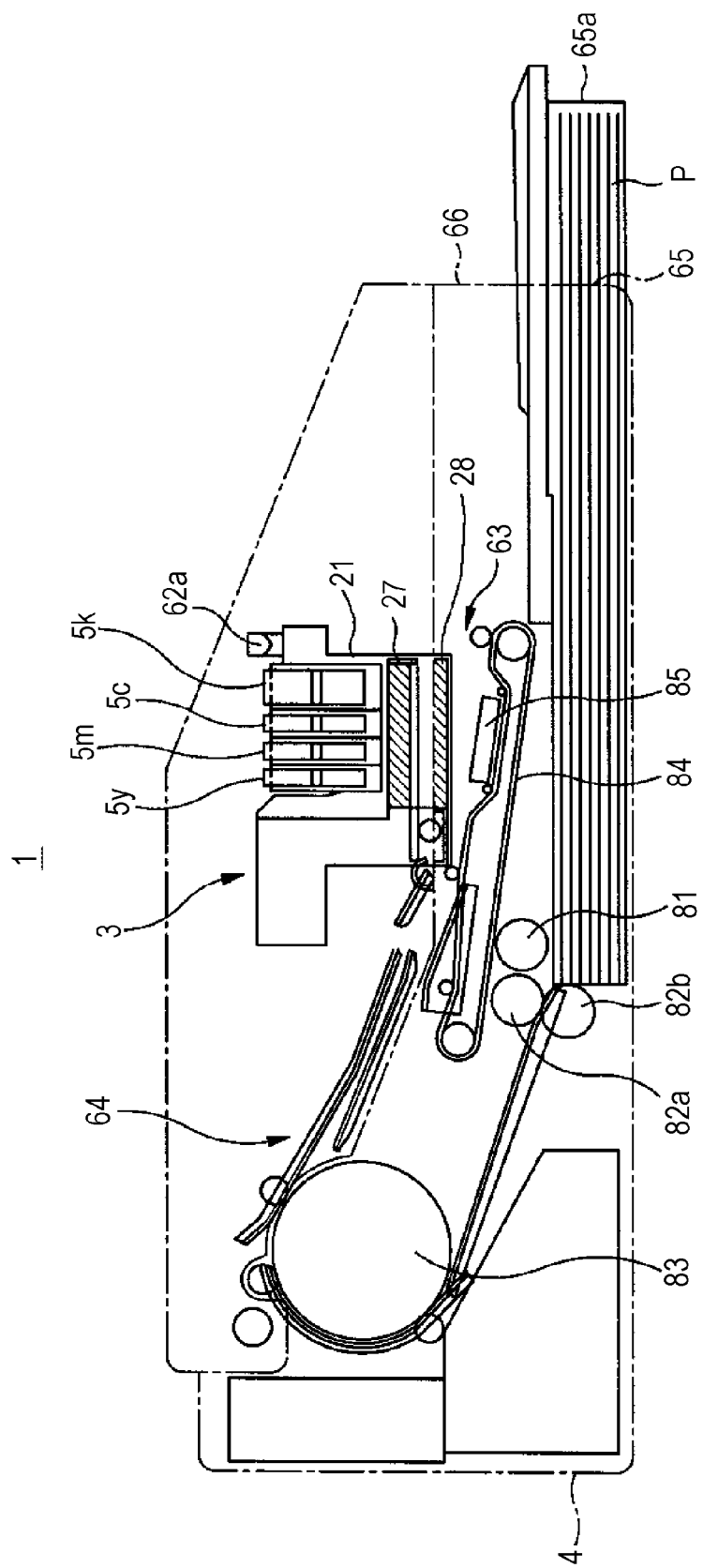
FIG. 10 is a see-through side view which schematically shows a part of the ink-jet printer.

As shown in FIGS. 1 and 10, the printer main body 4 includes a head cartridge mounting section 61 on which the head cartridge 3 is mounted, a head cartridge retention mechanism 62 for retaining and fixing the head cartridge 3 on the head cartridge mounting section 61, a head cap opening and closing mechanism 63 for opening and closing the head cap, a paper feeding and discharging mechanism 64 for feeding and discharging the recording sheet P, a paper feed port 65 for feeding the recording sheet P to the paper feeding and discharging mechanism 64, and a paper discharge port 66 for outputting the recording sheet P from the paper feeding and discharging mechanism 64.

The head cartridge mounting section 61 is a concave section on which the head cartridge 3 is installed. In order to perform printing on the travelling recording sheet according to data, the head cartridge 3 is mounted so that the ejection surface 27a of the ink ejection head 27 and the surface of the recording sheet P are substantially parallel to each other.

There may be a case in which the head cartridge 3 must be replaced due to ink clogging in the ink ejection head 27, etc., and although the replacement frequency is not as high as that of the ink cartridge 5, the head cartridge 3 is a consumable part. Therefore, the head cartridge 3 is retained by the head cartridge retention mechanism 62 detachably from the head cartridge mounting section 61.

The head cartridge retention mechanism 62 is a mechanism for retaining the head cartridge 3 detachably from the head cartridge mounting section 61. A knob 62a provided on the head cartridge 3 is secured to a force-applying member, such as a spring, provided on a locking hole 62b of the printer main body 4, not shown in the drawing, and the head cartridge 3 is positioned so as to be contact bonded to a reference plane 4a provided on the printer main body 4, and thus the head cartridge 3 can be retained and fixed.

The head cap opening and closing mechanism 63 includes a drive for opening and closing the head cap 28 of the head cartridge 3. When printing is performed, the mechanism 63 opens the head cap 28 so that the ink ejection head 27 is exposed to the recording sheet P. When printing is completed, the mechanism 63 closes the head cap 28 to protect the ink ejection head 27.

The paper feeding and discharging mechanism 64 includes a drive for transporting the recording sheet P. The mechanism 64 transports the recording sheet P fed from the paper feed port 65 to the ink ejection head 27 of the head cartridge 3, transports the recording sheet P on which ink droplets i ejected from the nozzles 55a have been allowed to land and which has been printed to the paper discharge port 66, and discharges the recording sheet P. The paper feed port 65 is an opening for feeding the recording sheet P to the paper feeding and discharging mechanism 64. A plurality of recording sheets P can be stacked and stored in the tray 65a, etc. The paper discharge port 66 is an opening for discharging the recording sheet P on which ink droplets i have been allowed to land and which has been printed.

Figure 11:
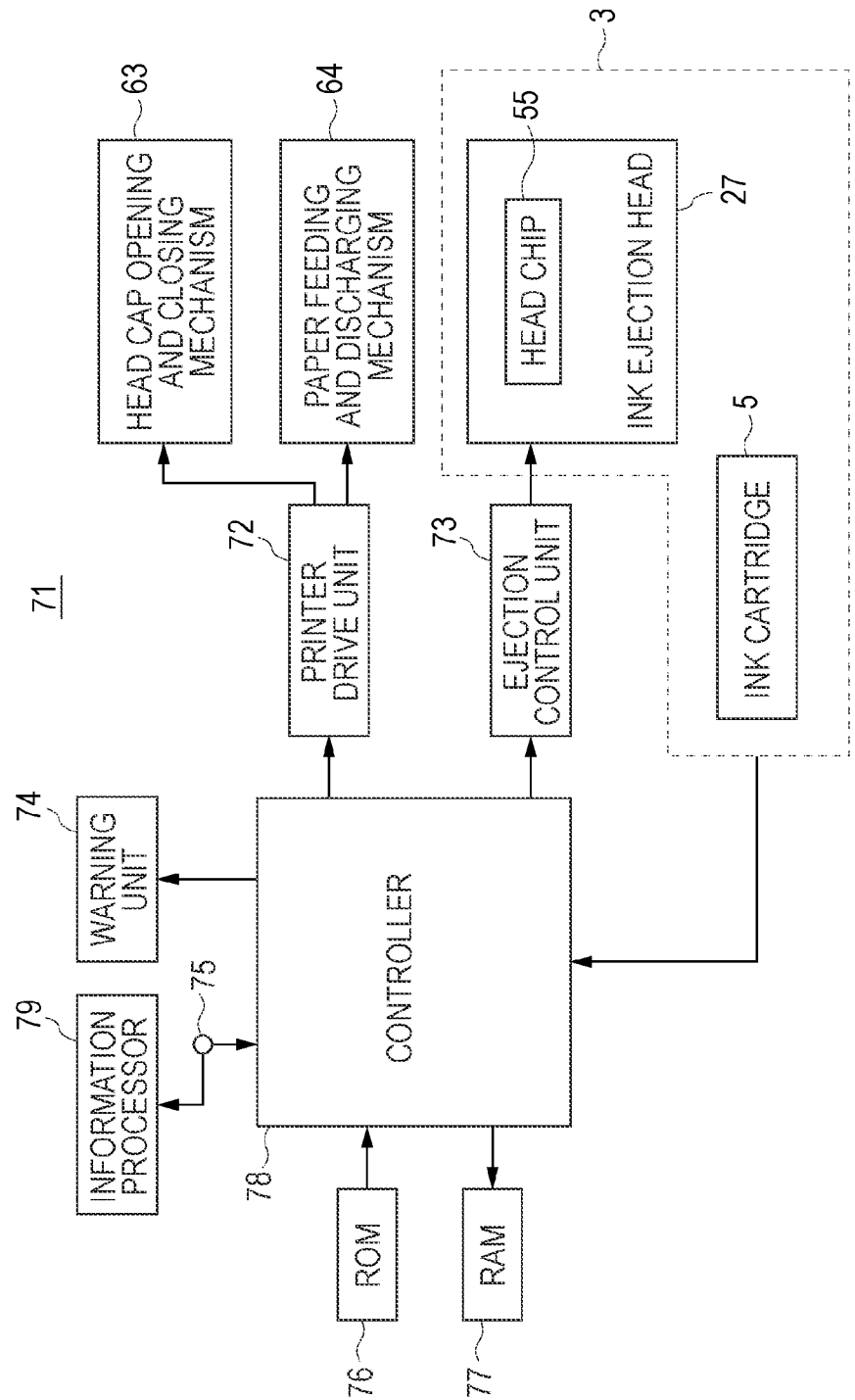
FIG. 11 is a block diagram which schematically shows a control circuit of the ink-jet printer.

Next, a control circuit 71 shown in FIG. 11, which controls printing by the printer 1 having the structure described above, will be described with reference to the drawings.

The control circuit 71 includes a printer drive unit 72 for controlling the driving of the head cap opening and closing mechanism 63 and the paper feeding and discharging mechanism 64 of the printer main body 4, an ejection control unit 73 for controlling current, etc., supplied to the ink ejection head 27 corresponding to the ink 2 of each color, a warning unit 74 for warning the user of the remaining amount of the ink 2 of each color, input/output terminals 75 for inputting and outputting signals from and to external apparatuses, a ROM (Read Only Memory) 76 on which control programs, etc., are recorded, a RAM (Random Access Memory) 77 in which control programs, etc. that have been read out are stored and from which the stored control programs, etc. are read out, and a controller 78 for controlling the individual units.

The printer drive unit 72 controls the head cap opening and closing mechanism 63 based on the control signal from the controller 78 by driving the drive motor constituting the head cap opening and closing mechanism 63 so that the head cap 28 is opened or closed. Furthermore, the printer drive unit 72 controls the paper feeding and discharging mechanism 64 based on the control signal from the controller 78 by driving the drive motor constituting the paper feeding and discharging mechanism 64 so that the recording sheet P is fed from the paper feed port 65 of the printer main body 4 and after printing, the recording sheet P is discharged from the paper discharge port 66.

The ejection control unit 73 is an electric circuit including switching elements for turning on/off the electrical connection with an external power which supplies a pulsed current to the heating resistors 58 provided on the ink ejection heads 27, resistive elements for adjusting a pulsed current supplied to the heating resistors 58, and a control circuit for controlling the on/off of the switching elements, etc. The ejection control unit 73 controls the ink ejection head 27 which ejects ink 2 from the nozzles 55a based on the control signal from the controller 78 by adjusting the pulsed current, etc., supplied to the heating resistors 58 provided on the ink ejection head 27.

The warning unit 74 is a display unit, such as a liquid crystal display (LCD), and displays information, such as the printing conditions, printing status, and ink remaining amounts. Alternatively, the warning unit 74 may be an audio output unit, such as a speaker, which outputs audio information, such as the printing conditions, printing status, and ink remaining amounts. Additionally, the warning unit 74 may be designed so as to have both a display unit and an audio output unit. This warning may be performed by a monitor, speaker, or the like of the information processor 79.

The input/output terminals 75 transmit the information, such as the printing conditions, printing status, and ink remaining amounts, to the external information processor 79, etc. Furthermore, the information, such as the printing conditions, printing status, and ink remaining amounts, is inputted into the input/output terminals 75 from the external information processor 79, etc. Herein, the information processor 79 is an electronic device, such as a personal computer or a personal digital assistant (PDA).

As the interface used in the input/output terminals 75 connected to the information processor 79, etc., for example, a serial interface or a parallel interface can be used. Specifically, interfaces according to USB (Universal Serial Bus), RS (Recommended Standard) 232C, IEEE (Institute of Electrical and Electronic Engineers) 1394, or the like can be used.

Data communication between the input/output terminals 75 and the information processor 79 may be performed either a wire communication mode or a wireless communication mode. Examples of the wireless communication standard include IEEE 802.11a, 802.11b, and 802.11g.

A network, such as Internet, may be interposed between the input/output terminals 75 and the information processor 79. In such a case, the input/output terminals 75 are connected to a network, such as LAN (Local Area Network), ISDN (Integrated Services Digital Network), xDSL (Digital Subscriber Line), FTHP (Fiber To The Home), CATV (Community Antenna TeleVision), or BS (Broadcasting Satellite), and data communication is performed with any of various protocols, such as TCP/IP (Transmission Control Protocol/Internet Protocol).

The ROM 76 is a memory, such as EP-ROM (Erasable Programmable Read-Only Memory), in which various processing programs carried out by the controller 78 are stored. The programs stored are loaded into the RAM 77 by the controller 78. The RAM 77 stores the programs read out from the ROM 76 by the controller 78 and the various statuses of the printer 1.

The controller 78 controls the individual units based on the printing data inputted from the input/output terminals 75, data of the remaining amount of the ink 2 inputted from the head cartridge 3, etc. The controller 78 reads out from the ROM 76 the processing programs for controlling the individual units based on inputted control signals or the like, stores the programs into the RAM 77, and performs controlling of the individual units and processing based on the processing programs.

In the control circuit 71 having the structure described above, processing programs are stored in the ROM 76. However, the medium for storing the processing programs is not limited to the ROM 76. The processing programs may be stored in any one of various types of recording mediums, such as optical disks, magnetic disks, magneto-optical disks, and IC cards. In such a case, the control circuit 71 is connected to a drive which drives any one of the recording mediums directly or via the information processor 79 so that the processing programs are read out from the recording medium.

Figure 12:
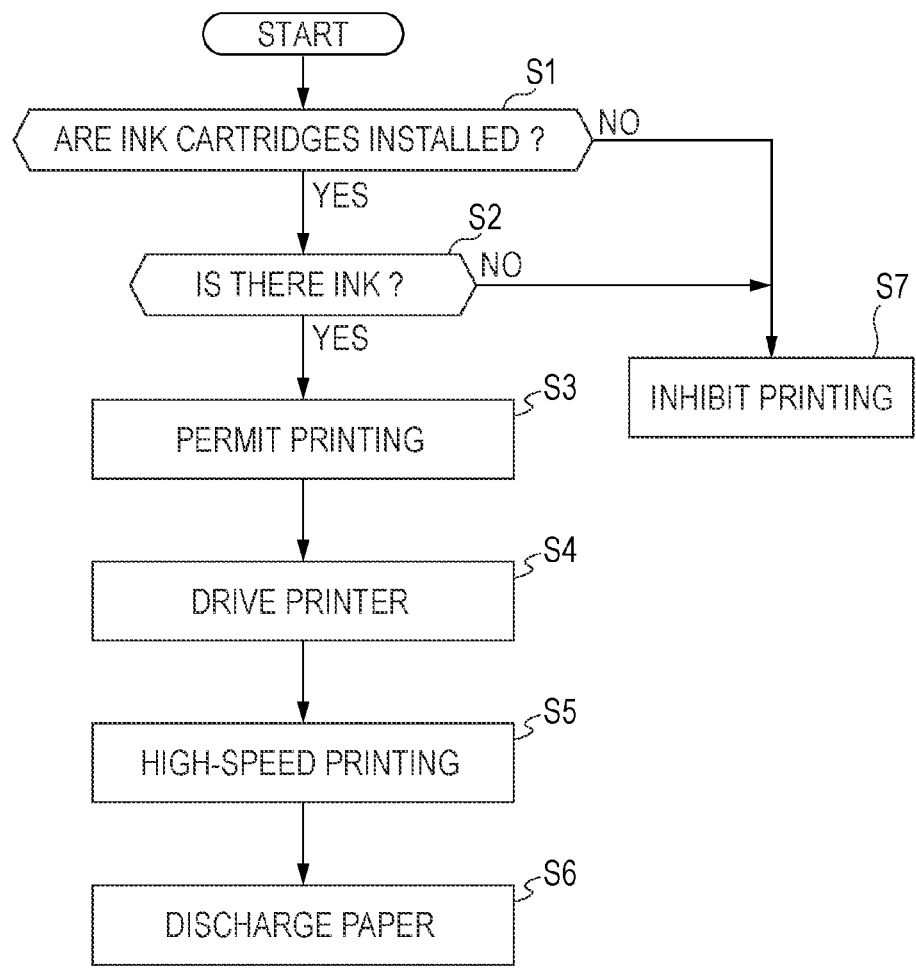
FIG. 12 is a flowchart which shows the recording process in the ink-jet printer.

The printing operation of the printer 1 having the structure described above will be described below with reference to a flowchart shown in FIG. 12. This operation is executed by arithmetic processing or the like of a central processing unit (CPU), not shown in the drawing, in the controller 78 based on the processing programs stored in a storing medium, such as the ROM 76.

First, the user operates an operation panel or the like provided on the printer main body 4 to order the printer 1 to carry out a printing operation. In Step S1, the controller 78 judges whether or not predetermined color ink cartridges 5 are mounted on the individual mounting sections 22. When all of the predetermined color ink cartridges 5 are mounted on the individual mounting sections 22 properly, the controller 78 proceeds to Step S2. When the ink cartridges 5 are not properly mounted on the mounting sections 22, the controller 78 proceeds to Step S7 to inhibit printing.

In Step S2, the controller 78 judges whether or not the amount of ink 2 in the ink cartridge 5 is smaller than the predetermined level, namely, whether or not there is ink. When the controller 78 judges that there is no ink, the warning unit 74 warns the user of that fact and printing is inhibited in Step S7. On the other hand, when the amount of ink 2 in the ink cartridge 5 is larger than the predetermined amount, namely, when the ink cartridge 5 is filled with the ink 2, the controller 78 permits printing in Step S3.

Figure 13:
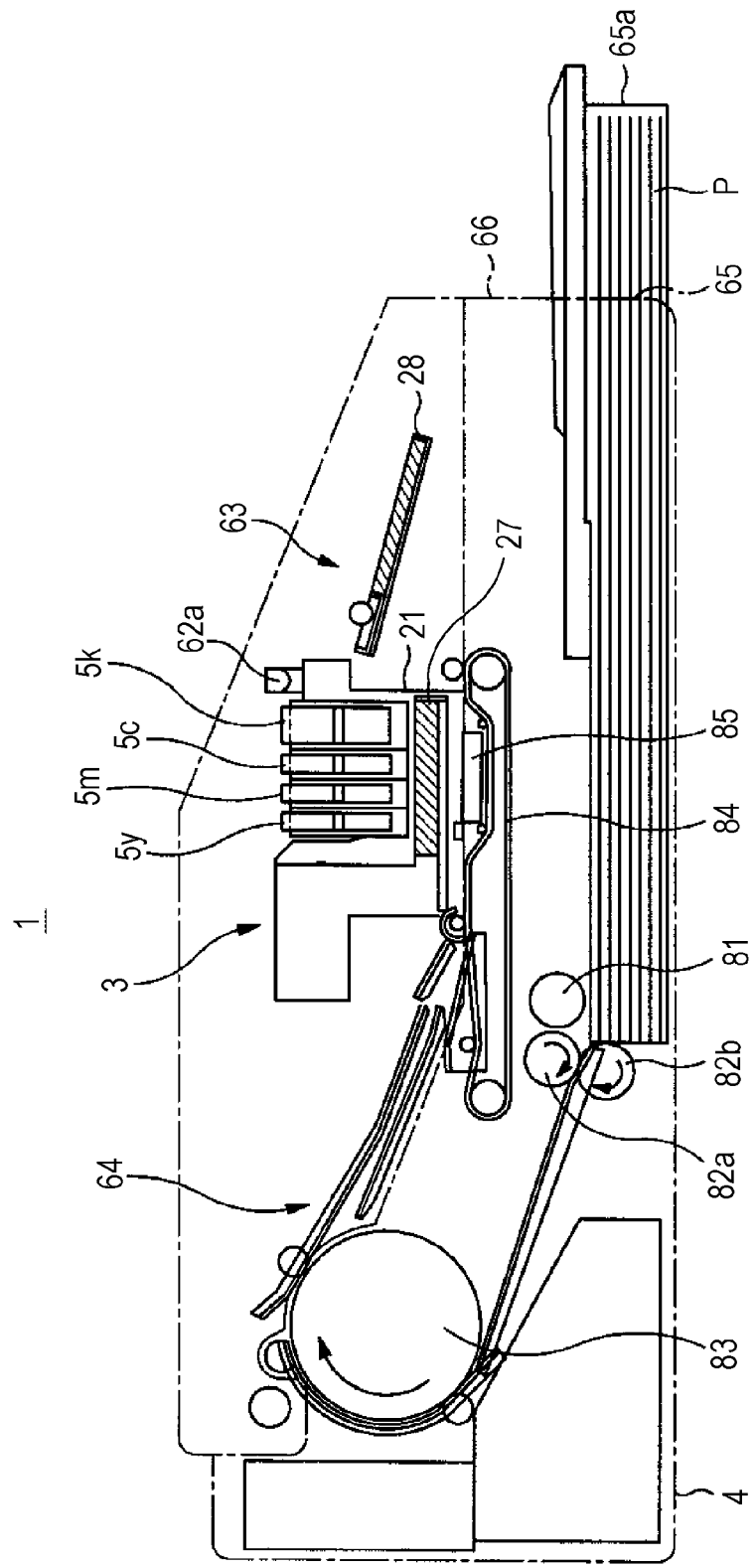
FIG. 13 is a see-through side view which schematically shows a part of the ink-jet printer in which a head cap opening and closing mechanism is open.

When the printing operation is performed, in Step S4, the controller 78 allows the printer drive unit 72 to drive and control the mechanisms 63 and 64 to transport the recording sheet P to a printable position. Specifically, as shown in FIG. 13, the controller 78 drives the drive motor constituting the head cap opening and closing mechanism 63 to move the head cap 28 to the tray 65a side of the head cartridge 3 and to expose the nozzles 55a of the ink ejection head 27. The controller 78 drives the drive motor constituting the paper feeding and discharging mechanism 64 to allow the recording sheet P to travel. More specifically, the controller 78 controls the paper feeding and discharging mechanism 64 so that recording sheets P are pulled out from the tray 65a by a paper feed roller 81; one of the pulled out recording sheets P is transported to the reverse roller 83 by a pair of separating rollers 82a and 82b which rotate in the same direction; after the transporting direction is reversed, the recording sheet P is transported to a conveyor belt 84; the recording sheet P transported to the conveyor belt 84 is retained at a predetermined position by a presser 85, thus determining the position on which the ink 2 is allowed to land.

In Step S5, the controller 78 allows the ejection control unit 73 to drive the heating resistor 58 of the head chip 54 with a pulsed current at about 5 kHz to 10 kHz to eject ink droplets i with a volume of 10 pl or less from each nozzle 52a at an interval of about one five thousandth of a second to one ten thousandth of a second to the recording sheet P transported to the printing position, and thus images, characters, etc., composed of ink dots are recorded. Namely, high-speed recording is performed.

At this stage, in the ink 2 in the ink ejection head 27, since the foaming power is set in a range of 0 mm to 50 mm and the foam stability is set in a range of 0 mm to 50 mm, it is possible to inhibit microscopic air bubbles from being produced in the ink 2 moving in the ink passage 52, and it is possible to inhibit microscopic air bubbles from being produced in the ink 2 contained in the ink liquid chamber 57. Thereby, ink droplets i can be ejected at high speed with excellent ejection stability.

In the images and characters printed at high speed, since the ink 2 contains the nonionic surfactant described above and the wettability of the ink 2 to the recording sheet P is improved, the ink 2 permeates through the recording sheet P without bleeding, and high-quality images in which edge-bleeding and mixed color mottling are prevented from occurring are produced.

When an ink droplet i is ejected from the nozzle 55a, the same amount of ink 2 as the amount ejected is immediately replenished from the ink passage 52 into the ink liquid chamber 57, and as shown in FIG. 5B, the original state is restored. With respect to the valve 45 which closes the opening 44 of the ink chamber 42 by the force applied by the force-applying member 46 and the force applied by the diaphragm 49, when the ink droplet i is ejected from the ink ejection head 27 and when the negative pressure of the ink 2 in the ink outflow channel 43 side of the ink chamber 42 divided by the opening 44 is increased, the diaphragm 49 is pushed up by the atmospheric pressure due to the negative pressure of the ink 2, and the valve 45 together with the valve shaft 48 is pushed up against the force applied by the force-applying member 46.

The opening 44 between the ink inflow channel 41 side and the ink outflow channel 43 side in the ink chamber 42 is opened, and the ink 2 is supplied from the ink inflow channel 41 side to the ink outflow channel 43 side. The ink 2 is replenished into the ink passage 52 of the ink ejection head 27. As a result, the negative pressure of the ink 2 is decreased, and the diaphragm 49 regains the original shape due to its restoring force, and the valve 45 together with the valve shaft 48 is pushed down by the force applied by the force-applying member 46 so that the ink chamber 42 is closed. As described above, in the valve system 34, the negative pressure of the ink 2 is increased whenever the ink droplet i is ejected, and the operation described above is repeated.

In the head cartridge 3 in which the ink 2 is supplied to the ink ejection head 27 as described above, even when the supply of the ink 2 is repeated, namely, when the ink 2 is repeatedly supplied through the complex channel of in the valve system 34, since the ink 2 has a foaming power of 0 to 50 mm and a foam stability of 0 to 50 mm, microscopic air bubbles are inhibited from being produced in the ink 2 moving through the channel, and the ink 2 in which microscopic air bubbles are not produced is supplied to the ink ejection head 27. Thus, excellent ejection stability can be obtained.

In this way, characters and images in accordance with the printing data are printed at high speed with high quality onto the recording sheet P which travels by means of the paper feeding and discharging mechanism 64. In Step S6, the recording sheet P on which printing has been performed is discharged from the paper discharge port 66 by the paper feeding and discharging mechanism 64.

In the printer 1 described above, the ink 2 having a foaming power of 0 to 50 mm and a foam stability of 0 to 50 mm is contained in the ink cartridge 5, and the ink 2 is ejected in the form of droplets i from the nozzle 55a onto the recording sheet P. Microscopic air bubbles are inhibited from being produced in the ink 2 and excellent ejection stability is obtained. Consequently, high-quality images and characters can be printed.

In the printer 1, even when high-speed printing is performed, the ink 2 has a foaming power of 0 to 50 mm and a foam stability of 0 to 50 mm and ink droplets i with a microscopic volume are ejected with excellent ejection stability from each nozzle 55a of microscopic diameter. Consequently, high-quality images and characters can be printed in a short period of time.

Furthermore, in the printer 1, an organic compound represented by Chemical Formula 1 is added as a nonionic surfactant to the ink 2 in order to set the foaming power and foam stability of the ink 2 at predetermined values. Consequently, the wettability of the ink 2 to the recording sheet P is improved, the ink 2 permeates through the recording sheet P without bleeding. Thereby, it is possible to print high-quality images in which edge-bleeding and mixed color mottling are prevented from occurring.

In the head cartridge 3 described above, the ink cartridge 5 is detachably installed in the cartridge main body 21. However, the present invention is not limited to such a structure. Since the head cartridge 3 itself is a consumable part and is detachably installed in the printer main body 4, it is also possible to employ a structure in which the ink cartridge 5 is integrally provided on the cartridge main body 21.

The embodiments in which the present invention is applied to printers have been described above. However, it is to be understood that the present invention is not limited to the disclosed embodiments. The present invention can also be widely applied to other liquid ejection apparatuses for ejecting liquid. For example, the present invention can be applied to facsimile machines, copy machines, liquid ejection apparatuses for DNA chips suspended in liquid (Japanese Unexamined Patent Application Publication No. 2002-253200), and liquid ejection apparatuses for ejecting liquid containing conductive particles for forming interconnecting patterns in printed wiring boards.

As the example of the ejection device, the head chip 53 in which one heating resistor 58 applies heat to eject the ink 2 has been described above. However, the present invention is not limited to such a structure. The present invention is also applicable to a liquid ejection cartridge or a liquid ejection apparatus provided with an ejection device which is provided with a plurality of pressure-generating elements and in which the ejection direction can be controlled by supplying different energies or energy at different timings to the individual pressure-generating elements.

The ejection device using an electrothermal conversion system in which the ink 2 is ejected while heating the ink 2 with one heating resistor 58 has been described above. The present invention is not limited to such an ejection device. The present invention is also applicable to, for example, ejection devices using an electromechanical conversion system in which a recording liquid is electromechanically ejected with an electromechanical converting element, such as a piezoelectric element (Japanese Unexamined Patent Application Publication Nos. 55-65559, 62-160243, and 2-270561).

Furthermore, the line-type printer 1 has been described above. However, the present invention is not limited thereto. For example, the present invention is also applicable to a serial-type liquid ejection apparatus in which an ink head moves in a direction substantially perpendicular to the travelling direction of a recording sheet P.

EXAMPLES

Examples in which inks were prepared as the recording liquids of the present invention and Comparative Examples will be described below.

Example 1

An ink precursor was prepared by mixing 3 parts by weight of C.I. Direct Blue 199 as a dye serving as a coloring agent, 79 parts by weight of water as a solvent, 10 parts by weight of glycerol, 4 parts by weight of propylene glycol, and 3 parts by weight of 1,3-butanediol as other solvents, and 1 part by weight of a NEXCOAT manufactured by Nikko Chemicals Co., Ltd., i.e., an organic compound represented by Chemical Formula 2 below in which the total amount of ethylene oxide (hereinafter abbreviated as "EO") (m+n) was set at 4, as a nonionic surfactant.

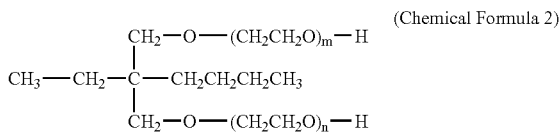
(Chemical Formula 2)

The ink precursor thus prepared was stirred for 4 hours at 60° C., and the ink precursor was then subjected to forced filtration under pressure using a membrane filter with a mesh pore size of 0.8 μm manufactured by Advantec, Inc. An ink was thereby prepared.

Example 2

In Example 2, an ink was prepared as in Example 1 except that 2-pyrrolidone was used instead of 1,3-butanediol.

Example 3

In Example 3, an ink precursor was prepared by mixing 4 parts by weight of Y-1189 manufactured by ILFORD Imaging Limited as a dye serving as a coloring agent, 79 parts by weight of water as a solvent, 10 parts by weight of glycerol, 4 parts by weight of propylene glycol, and 3 parts by weight of 1,3-butanediol as other solvents, and 1 part by weight of a NEXCOAT manufactured by Nikko Chemicals Co., Ltd., i.e., an organic compound represented by Chemical Formula 2 in which the total amount of EO (m+n) was set at 2, as a nonionic surfactant. An ink was prepared as in Example 1 except that such an ink precursor was prepared.

Example 4

In Example 4, an ink precursor was prepared by mixing 3 parts by weight of M-1114 manufactured by ILFORD Imaging Limited as a dye serving as a coloring agent, 82 parts by weight of water as a solvent, 10 parts by weight of glycerol and 4 parts by weight of propylene glycol as other solvents, and 1 part by weight of a NEXCOAT manufactured by Nikko Chemicals Co., Ltd., i.e., an organic compound represented by Chemical Formula 2 in which the total amount of EO (m+n) was set at 2, as a nonionic surfactant. An ink was prepared as in Example 1 except that such an ink precursor was prepared.

Comparative Example 1

In Comparative Example 1, an ink precursor was prepared by mixing 3 parts by weight of C.I. Direct Blue 199 as a dye serving as a coloring agent, 79.5 parts by weight of water as a solvent, 10 parts by weight of glycerol, 4 parts by weight of propylene glycol, and 3 parts by weight of 1,3-butanediol as other solvents, and 0.5 parts by weight of acetylenic glycol (trade name: SURFYNOL 465) manufactured by Air Products and Chemicals, Inc. as a surfactant. An ink was prepared as in Example 1 except that such an ink precursor was prepared.

Comparative Example 2

In Comparative Example 2, an ink was prepared as in Comparative Example 1 except that 2-pyrrolidone was used instead of 1,3-butanediol.

Comparative Example 3

In Comparative Example 3, an ink was prepared as in Comparative Example 1 except that S-1 manufactured by Nippon Kayaku Co., Ltd. was used as the coloring agent instead of C.I. Direct Blue 199.

With respect to the inks prepared in Examples and Comparative Examples, the foaming power and foam stability were measured by the same test method as that according to JIS-K3362. The measurement was performed in an atmosphere of 25° C.

Table 1 below shows the results of measurement of the foaming power and foam stability in each of Examples and Comparative Examples.

TABLE 1

|  | Foaming power (mm) | Foam stability (mm) |
| --- | --- | --- |
| Example 1 | 30 | 0 |
| Example 2 | 32 | 0 |
| Example 3 | 35 | 0 |
| Example 4 | 50 | 0 |
| Comparative Example 1 | 95 | 0 |
| Comparative Example 2 | 60 | 0 |
| Comparative Example 3 | 200 | 0 |

As is evident from the results shown in Table 1, the inks in Examples 1 to 4 has a lower foaming power, i.e., 50 mm or less, compared with the inks in Comparative Examples 1 to 3, and thus foaming does not easily occur.

Next, with respect to the ink in each of Examples and Comparative Examples, frequency responsiveness was evaluated by a method in which, using an ink-jet printer provided with a head chip including heating resistors each with an area of 20×20 μm$^2$ and 24 nozzles with a size of 20 μm, the head chip was driven at a voltage of 8.5 V and ink droplets each with a volume of 10 pl were ejected from the nozzles to print alphabetical characters and to perform solid printing, i.e., filling a predetermined region with the ink, on PPC paper manufactured by Xerox Corp.

Table 2 below shows the evaluation results of frequency responsiveness in each of Examples and Comparative Examples.

TABLE 2

| | Frequency responsiveness | |
| --- | --- | --- |
| | 5 kHz | 8 kHz |
| Example 1 | ⊙ | ⊙ |
| Example 2 | ⊙ | ⊙ |
| Example 3 | ⊙ | ⊙ |
| Example 4 | ○ | ○ |
| Comparative Example 1 | X | X |
| Comparative Example 2 | X | X |
| Comparative Example 3 | X | X |

In order to evaluate the frequency responsiveness, with respect to character printing and solid printing when the heating resistors were driven with pulsed currents at frequencies of 5 kHz and 8 kHz, namely, when high-speed ejection was performed, it was visually observed whether or not there were thin spots or spots to which ink droplets did not land, i.e., unprinted spots. Evaluation was performed using the following four criteria:

⊚: No thin spot or unprinted spot was observed both in character printing and in solid printing.

○: Slightly thin spots were observed only in solid printing.

Δ: Thin spots and unprinted spots were observed only in solid printing in a range of one thirds or more of the entire printed area.

x: Thin spots and unprinted spots were observed both in character printing and in solid printing.

In the head chip, when the heating resistors were driven with a pulsed current at a frequency of 5 kHz, ink droplets were ejected from each nozzle about 5,000 times per second. When the heating resistors were driven with a pulsed current at a frequency of 8 kHz, ink droplets were ejected from each nozzle about 8,000 times per second.

As is evident from the evaluation results shown in Table 2, the inks in Examples 1 to 4, in which the foaming power is 50 mm or less, show excellent frequency responsiveness compared with the inks in Comparative Examples 1 to 3 in which the foaming power is larger than 50 mm.

Each of the inks in Examples 1 to 4 contains a nonionic surfactant represented by Chemical Formula 2, the foaming power is set in a range of 0 mm to 50 mm, and the foam stability is set in a range of 0 mm to 50 mm. Thereby, foaming does not easily occur. Consequently, even if ink droplets were ejected from nozzles at high speed, microscopic air bubbles are prevented from being produced in the ink contained in the head chip, and high-speed ejection is performed with excellent ejection stability. Therefore, in Examples 1 to 4, it is possible to perform high-quality character printing without bleeding or poor coverage.

In contrast, each of the inks in Comparative Examples 1 to 3 has a foaming power exceeding 50 mm, and thereby microscopic air bubbles are produced in ink when the ink is supplied to the head chip, resulting in a degradation in ejection stability, such as non-ejection of ink. In Comparative Examples, when high-speed ejection is performed, namely, when ink droplets are ejected at a short interval, it becomes difficult to properly eject an ink droplet each time, resulting in thin spots or unprinted spots, and thus printing quality is degraded.

As is clear from what has been described above, it is very important to set the foaming power in a range of 0 mm to 50 mm and the foam stability in a range of 0 mm to 50 mm, the foaming power and foam stability being determined by substantially the same test method as that used to determine the foaming power and foam stability according to JIS-3362, in order to prepare inks having excellent frequency responsiveness.

What is claimed is:

1. A liquid cartridge comprising:

a liquid container section for containing a recording liquid; and a liquid supply section for supplying the recording liquid contained in the liquid container section to an ejection device, wherein, the liquid cartridge functions as a supply source of the recording liquid to the ejection device, is detachably installed in a liquid ejection apparatus and includes (1) a liquid chamber for containing the recording liquid, (2) a pressure-generating element which generates a pressure to place the recording liquid contained in the liquid chamber under increased pressure, and (3) the ejection device which includes an ejection port for ejecting the recording liquid pressure-in the form of droplets when placed under increased pressure by the pressure-generating element, (4) which drives the pressure-generating element with a pulsed current at a frequency of 5 kHz or more, and (5) which causes each droplet to eject with a volume of 10 pl or less, the recording liquid comprises (a) a coloring matter which imparts color to the recording liquid, (b) a solvent for dissolving or dispersing the coloring matter, and (c) a nonionic surfactant, and the recording liquid has a foaming power of 0 mm to 50 mm and a foam stability of 0 mm to 50 mm, the foaming power and the foam stability being determined by substantially the same test method as that used to determine the foaming power and foam stability according to a Japanese Industrial Standard, JIS-K3362.

2. The liquid cartridge according to claim 1, wherein the nonionic surfactant is a compound represented by Chemical Formula 2:

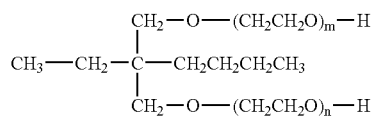

wherein each of m and n is an integer of 1 or more, and the sum of m and n is 2 to 30.

3. A liquid ejection cartridge comprising:

a liquid chamber for containing a recording liquid;

a pressure-generating element which generates a pressure to place the recording liquid contained in the liquid chamber under increased pressure; and an ejection device (1) which includes an ejection port for ejecting the recording liquid in the form of droplets when placed under increased pressure by the pressure-generating element, (2) which drives the pressure-generating element with a pulsed current at a frequency of 5 kHz or more, and (3) which causes each droplet to eject with a volume of 10 pl or less, the liquid ejection cartridge being detachably installed in a liquid ejection apparatus which allows the recording liquid to adhere to an object to perform recording, wherein, the recording liquid comprises (a) a coloring matter which imparts color to the recording liquid, (b) a solvent for dissolving or dispersing the coloring matter, and (c) a nonionic surfactant, and the recording liquid has a foaming power of 0 mm to 50 mm and a foam stability of 0 mm to 50 mm, the foaming power and the foam stability being determined by substantially the same test method as that used to determine the foaming power and foam stability according to a Japanese Industrial Standard, JIS-K3362.

4. The liquid ejection cartridge according to claim 3, wherein the nonionic surfactant is a compound represented by Chemical Formula 3:

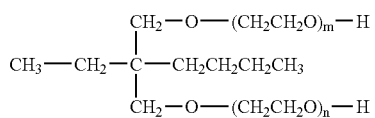
wherein each of m and n is an integer of 1 or more, and the sum of m and n is 2 to 30.
5. The liquid ejection cartridge according to claim 3, wherein a plurality of ejection ports are substantially linearly arrayed.
* * * * *